(12) United States Patent
Cui

(10) Patent No.: US 11,378,978 B2
(45) Date of Patent: Jul. 5, 2022

(54) SYSTEM AND METHOD FOR REACTING TO SIGNALS

(71) Applicant: Pony AI Inc., Grand Cayman (KY)

(72) Inventor: Piaoyang Cui, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 226 days.

(21) Appl. No.: 16/593,845

(22) Filed: Oct. 4, 2019

(65) Prior Publication Data
US 2021/0103291 A1 Apr. 8, 2021

(51) Int. Cl.
*G05D 1/02* (2020.01)
*G05D 1/00* (2006.01)
*B60Q 1/34* (2006.01)

(52) U.S. Cl.
CPC ............. *G05D 1/0276* (2013.01); *B60Q 1/34* (2013.01); *G05D 1/0022* (2013.01); *G05D 1/0088* (2013.01); *G05D 1/0231* (2013.01); *G05D 1/0257* (2013.01); *G05D 2201/0213* (2013.01)

(58) Field of Classification Search
CPC .. G05D 1/0276; G05D 1/0022; G05D 1/0088; G05D 1/0231; G05D 1/0257; G05D 2201/0213; G05D 1/0246; B60Q 1/34; B60Q 1/50; B60Q 1/525; G08G 1/167; G08G 1/164; G08G 1/166
See application file for complete search history.

(56) References Cited

U.S. PATENT DOCUMENTS

| | | | |
|---|---|---|---|
| 9,381,916 B1 | 7/2016 | Zhu et al. | |
| 10,118,548 B1* | 11/2018 | Fields | ............... B60Q 5/005 |
| 2018/0033308 A1* | 2/2018 | Litkouhi | ............. G05D 1/0289 |
| 2018/0196417 A1 | 7/2018 | Iagnemma et al. | |
| 2019/0215671 A1* | 7/2019 | Takii | ...................... H04L 51/38 |
| 2019/0248326 A1 | 8/2019 | McIntosh | |
| 2019/0367022 A1* | 12/2019 | Zhao | .................... B60W 30/09 |
| 2020/0255029 A1* | 8/2020 | Matsunaga | ............. G08G 1/20 |

* cited by examiner

*Primary Examiner* — Rodney A Butler
(74) *Attorney, Agent, or Firm* — Sheppard Mullin Richter & Hampton LLP

(57) ABSTRACT

Provided herein is a system and method of a vehicle that detects a signal and reacts to the signal. The system comprises one or more sensors; one or more processors; a memory storing instructions that, when executed by the one or more processors, causes the system to perform detecting a signal from a source; determining an intended action of the vehicle based on the detected signal; sending, to the source, a response signal indicative of the intended action; determining whether the source has sent a response to the response signal; and in response to determining that the source has sent a response to the response signal, taking the intended action based on the response to the response signal.

19 Claims, 20 Drawing Sheets

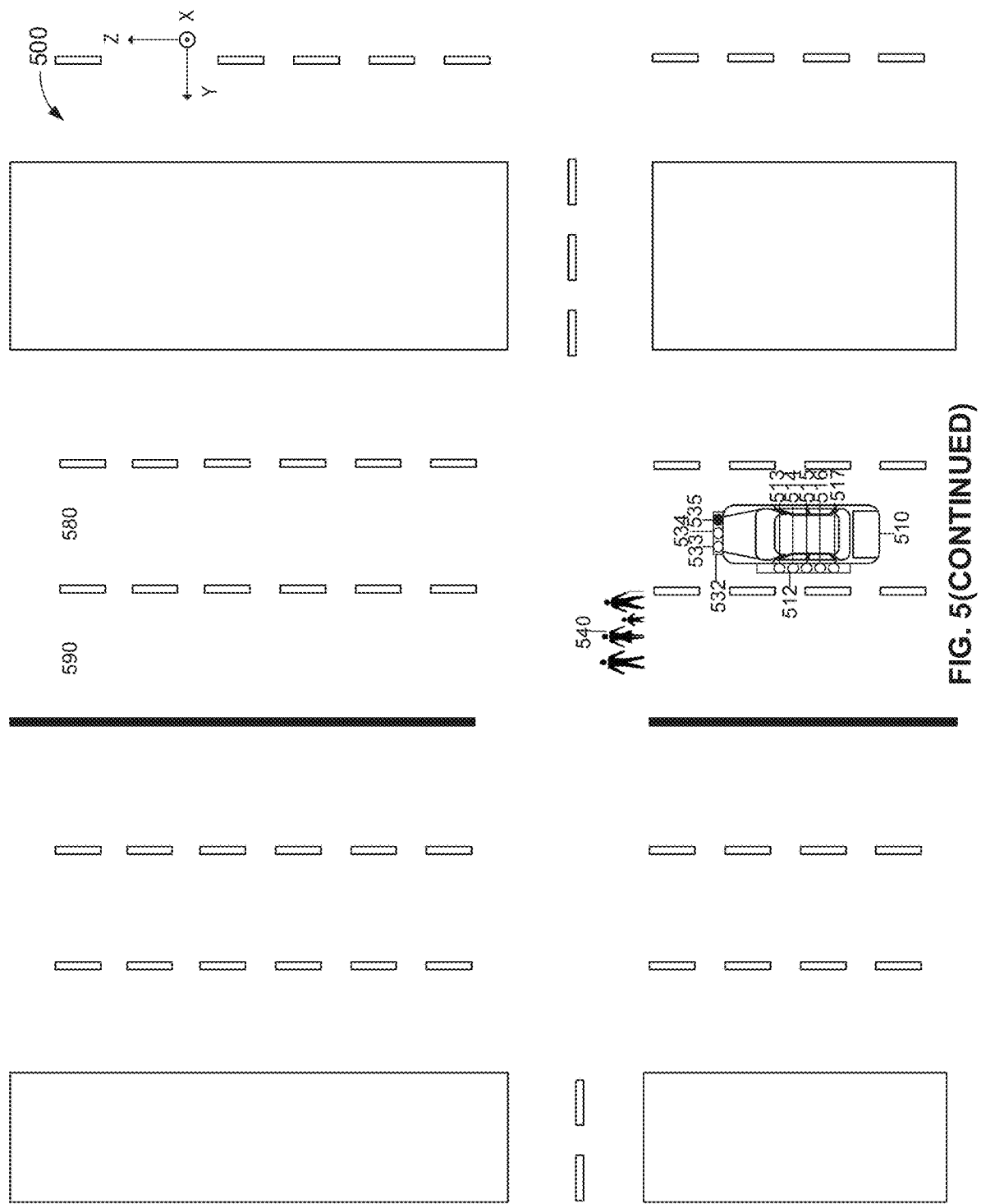

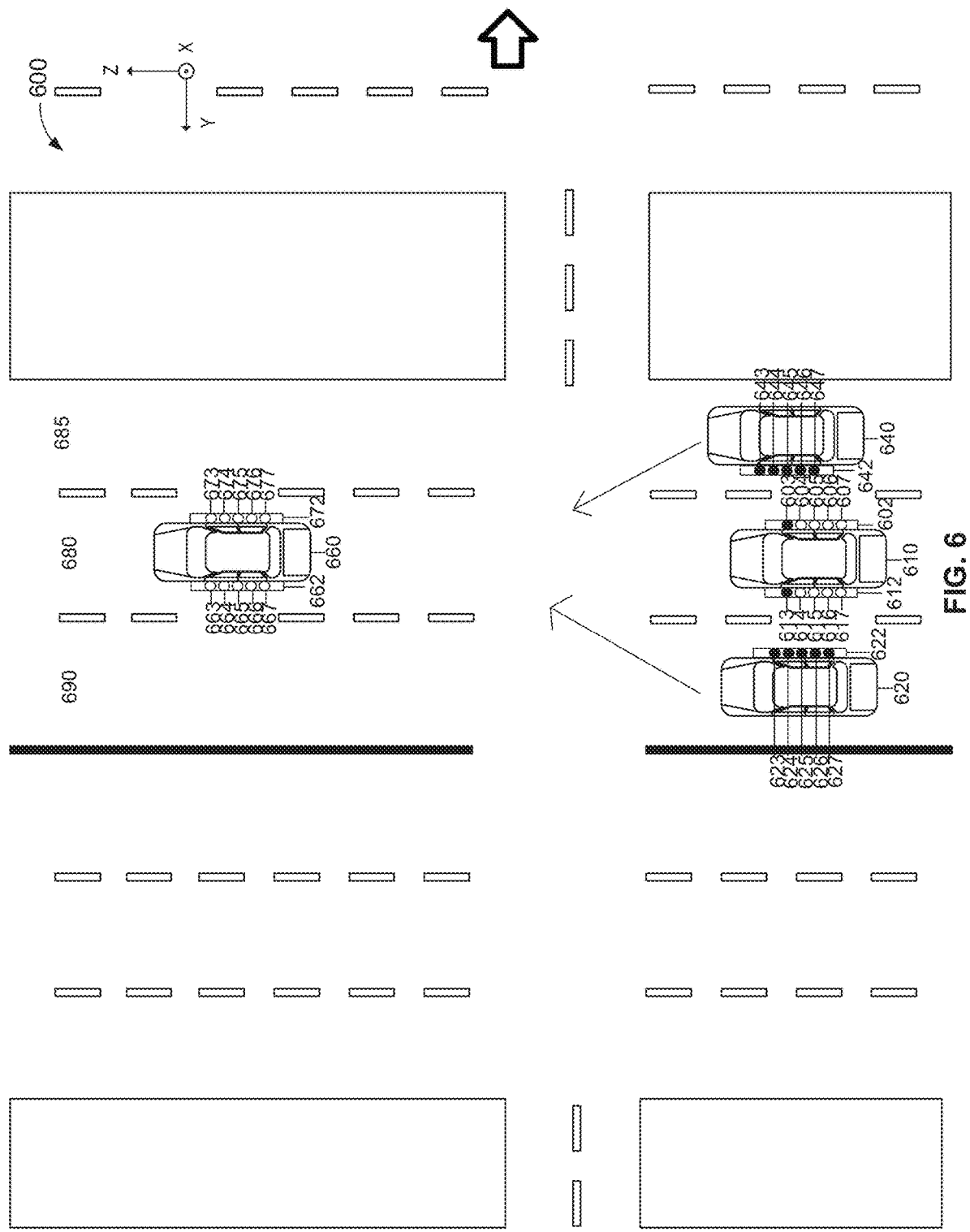

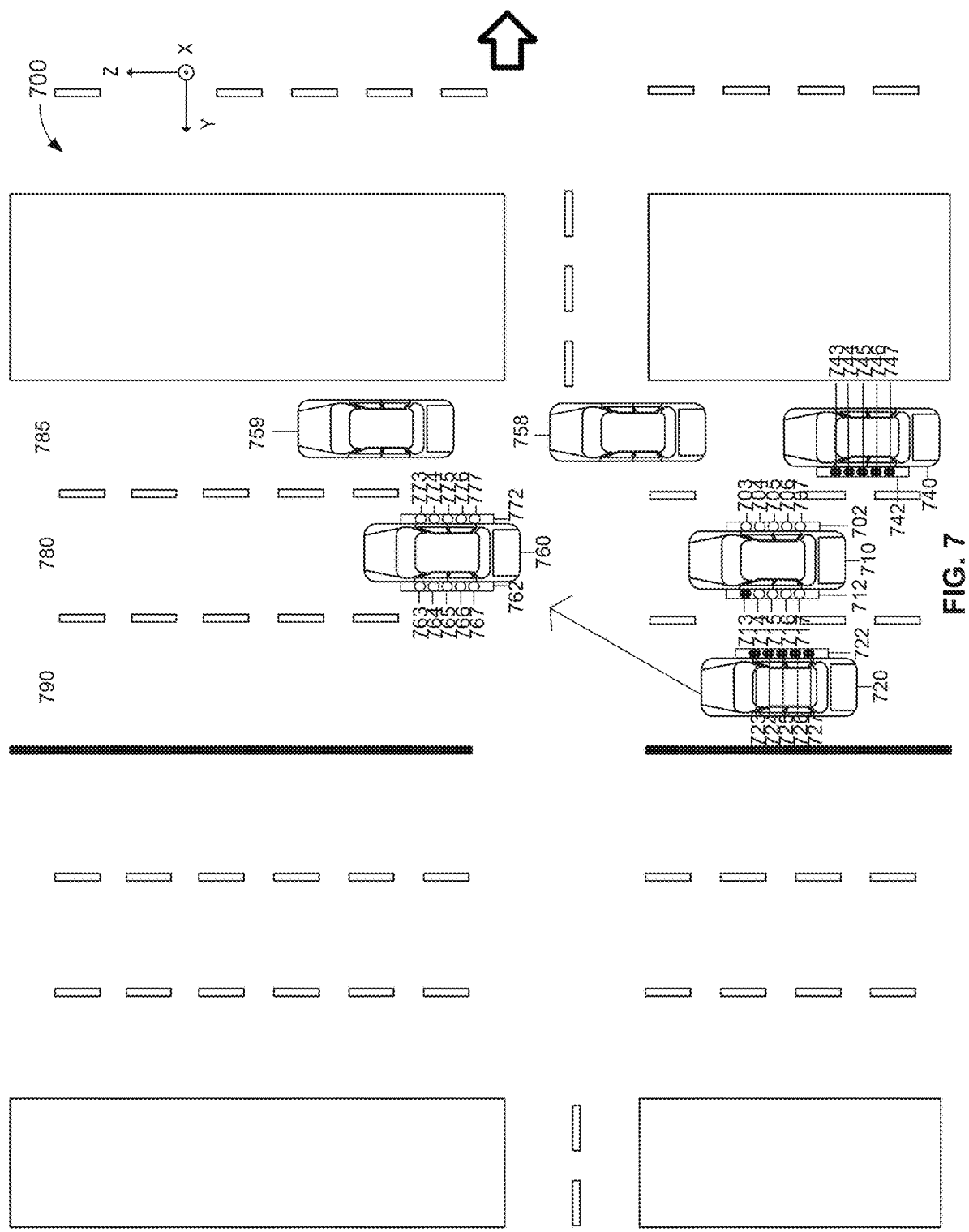

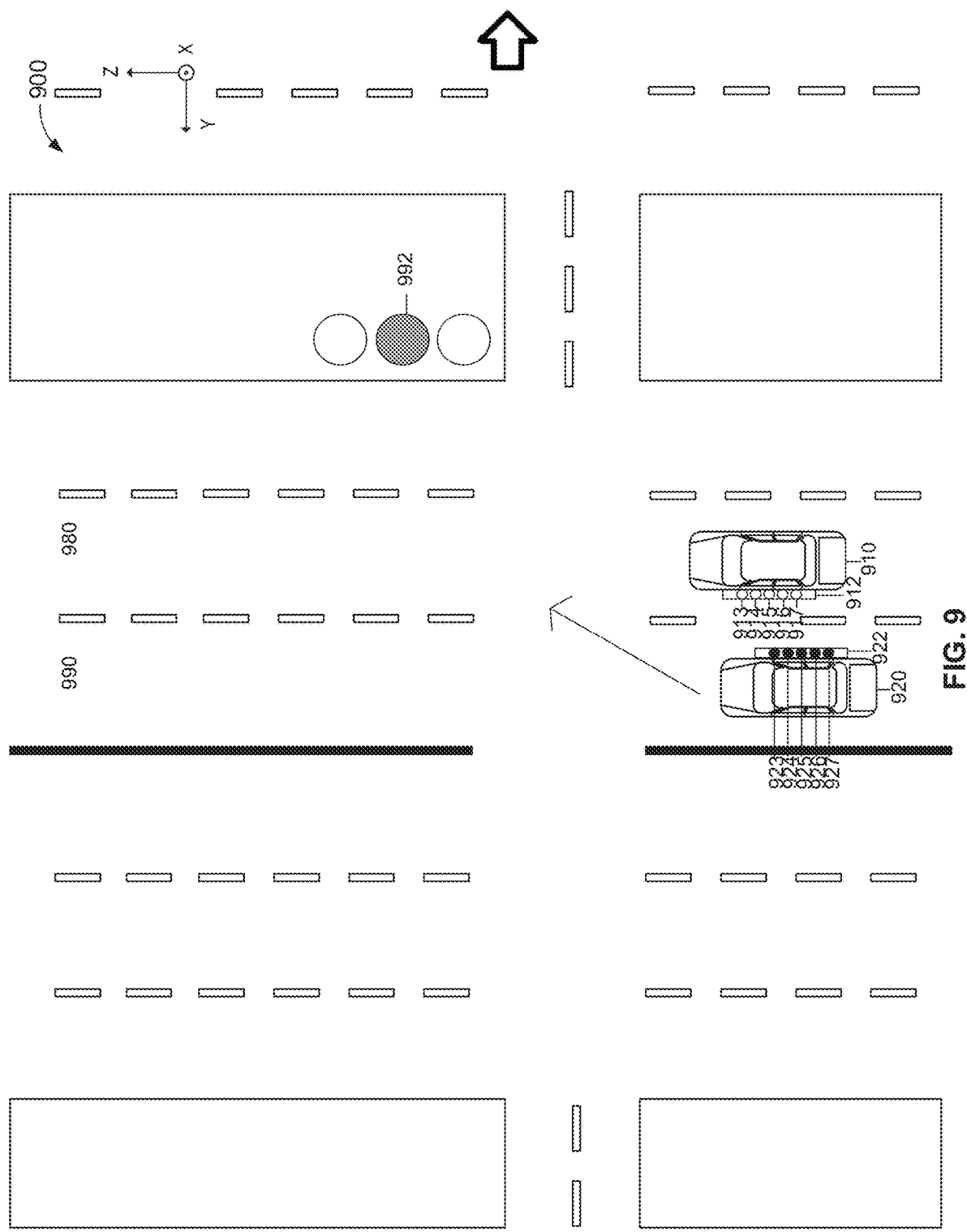

SYSTEM AND METHOD FOR REACTING TO SIGNALS

TECHNICAL FIELD

The present disclosure relates generally to vehicles such as assisted-driving vehicles or autonomous vehicles (AVs), and in particular, some embodiments relate to such vehicles detecting a signal, for instance, from an other vehicle or pedestrian, providing a response signal to the other vehicle or pedestrian, and taking an action in response to the detection of the signal.

BACKGROUND

On-board sensors in vehicles, such as autonomous vehicles (AVs), supplement and bolster the vehicle's field of vision by providing accurate sensor data. Sensor data is used, for example, in applications of blind spot detection, lane change assisting, rear end radar for collision warning or collision avoidance, park assisting, cross-traffic monitoring, brake assisting, emergency braking, turning, and/or automatic distance controlling. Examples of on-board sensors include, for example, passive sensors and active sensors. On-board sensors include camera, Lidar, radar, GPS, sonar, ultrasonic, IMU (inertial measurement unit), accelerometers, gyroscopes, magnetometers, and FIR (far infrared) sensors. Although sensors may detect objects such as road signs, parked vehicles, and pedestrians, the sensors may not be equipped to detect, interpret, and/or react to signals by other vehicles and pedestrians, such as an other vehicle in a neighboring lane signaling that the other vehicle plans to change lanes, or pass the vehicle, a pedestrian signaling that he or she plans to cross the street or to yield, and traffic signals by traffic controllers. These shortfalls are addressed by the present inventions, which provides an efficient and effective system and method to detect signals such as signals from other vehicles, pedestrians, and traffic controllers, and react to the detected signals.

SUMMARY

Described herein are systems and methods for detecting a signal from a source, determining an intended action in response to the detected signal, sending a response signal to indicate the intended action to the source, determining whether the source has sent a response to the response signal, and in response to determining that the source has sent a response to the response signal, taking the intended action based on the response to the response signal.

Various embodiments of the present disclosure provide a system comprising one or more sensors; one or more processors; and a memory storing instructions that, when executed by the one or more processors, causes the system to perform: detecting a signal from a source; determining an intended action of the vehicle in response to detecting the signal; sending, to the source, a response signal indicative of the intended action; determining whether the source has sent a response to the response signal; and in response to determining that the source has sent a response to the response signal, taking the intended action based on the response to the response signal.

In some embodiments, the instructions further cause the system to perform: predicting one or more responses to the response signal; in response to determining that the source has sent a response to the response signal, determining whether the response to the response signal matches one of the predicted one or more responses; if the response to the response signal matches one of the predicted one or more responses, taking the intended action; and if the response to the response signal does not match one of the predicted one or more responses, not taking the intended action.

In some embodiments, the instructions further cause the system to perform: if the response to the response signal does not match one of the predicted one or more responses, resending the response signal to the source; in response to resending the response signal to the source, determining whether the response to the resent response signal matches one of the predicted one or more responses; if the response to the response signal matches one of the predicted one or more responses, taking the intended action; and if the response to the response signal does not match one of the predicted one or more responses, determining an alternative action.

In some embodiments, the instructions further cause the system to perform: in response to determining that the source has not sent a response to the response signal, resending a response signal at an increased brightness to the source; in response to resending the response signal to the source, determining whether the source has sent a response to the resent response signal; in response to determining that the source has sent a response to the resent response signal, taking the intended action based on the response to the response signal; and in response to determining that the source has not sent a response to the resent response signal, not taking the intended action.

In some embodiments, the signal is a flashing light on a side of the source facing the vehicle, and indicates that the source intends to switch into a lane occupied by the vehicle; the intended action is yielding to the source; the response signal indicative of the intended action is a light moving from side to side; and the response to the response signal is speeding up the source while continuing the signal.

In some embodiments, the instructions further cause the system to perform: adjusting a brightness or a frequency of the response signal based on a weather or visibility condition.

In some embodiments, the detecting the signal from the source comprises: in response to the vehicle not being completely in front of or behind the source, with respect to a driving direction of the vehicle, detecting that the source is moving in a lateral direction towards the vehicle; and the intended action is yielding to the source.

In some embodiments, the determining the intended action of the vehicle comprises: determining potential intended actions of the vehicle; and selecting, as the intended action, one of the potential intended actions of the vehicle that consumes a least amount of resources and has a least amount of interference with one or more other vehicles or pedestrians.

In some embodiments, the instructions further cause the system to perform: in response to detecting two signals from two respective sources: determining whether to respond to the two signals simultaneously with a single intended action; in response to determining not to respond to the two signals simultaneously, determining which of the two signals has a higher priority.

In some embodiments, the determining which of the two signals has a higher priority is based on any of: which of the two signals was detected first, a current location of each of the two sources, and an intended destination of each of the two sources.

Various embodiments of the present disclosure provide a method implemented by a computing system including one or more processors and storage media storing machine-readable instructions, wherein the method is performed using the one or more processors. The method comprises detecting a signal from a source; determining an intended action of the vehicle in response to detecting the signal; sending, to the source, a response signal indicative of the intended action; determining whether the source has sent a response to the response signal; and in response to determining that the source has sent a response to the response signal, taking the intended action based on the response to the response signal.

In some embodiments, the method further comprises predicting one or more responses to the response signal; in response to determining that the source has sent a response to the response signal, determining whether the response to the response signal matches one of the predicted one or more responses; if the response to the response signal matches one of the predicted one or more responses, taking the intended action; and if the response to the response signal does not match one of the predicted one or more responses, not taking the intended action.

In some embodiments, the method further comprises, if the response to the response signal does not match one of the predicted one or more responses, resending the response signal to the source; in response to resending the response signal to the source, determining whether the response to the resent response signal matches one of the predicted one or more responses; if the response to the response signal matches one of the predicted one or more responses, taking the intended action; and if the response to the response signal does not match one of the predicted one or more responses, determining an alternative action.

In some embodiments, the method further comprises, in response to determining that the source has not sent a response to the response signal, resending a response signal at an increased brightness to the source; in response to resending the response signal to the source, determining whether the source has sent a response to the resent response signal; in response to determining that the source has sent a response to the resent response signal, taking the intended action based on the response to the response signal; and in response to determining that the source has not sent a response to the resent response signal, not taking the intended action.

In some embodiments, the signal is a flashing light on a side of the source facing the vehicle, and indicates that the source intends to switch into a lane occupied by the vehicle; the intended action is yielding to the source; the response signal indicative of the intended action is a light moving from side to side; and the response to the response signal is speeding up the source while continuing the signal.

In some embodiments, the method further comprises adjusting a brightness or a frequency of the response signal based on a weather or visibility condition.

In some embodiments, the detecting the signal from the source comprises: in response to the vehicle not being completely in front of or behind the source, with respect to a driving direction of the vehicle, detecting that the source is moving in a lateral direction towards the vehicle; and the intended action is yielding to the source.

In some embodiments, the determining the intended action of the vehicle comprises: determining potential intended actions of the vehicle; and selecting, as the intended action, one of the potential intended actions of the vehicle that consumes a least amount of resources and has a least amount of interference with one or more other vehicles or pedestrians.

In some embodiments, in response to detecting two signals from two respective sources: determining whether to respond to the two signals simultaneously with a single intended action; in response to determining not to respond to the two signals simultaneously, determining which of the two signals has a higher priority.

In some embodiments, the determining which of the two signals has a higher priority is based on any of: which of the two signals was detected first, a current location of each of the two sources, and an intended destination of each of the two sources.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In order for a vehicle such as an AV to interact with vehicles such as AVs and pedestrians, the vehicle may determine what actions the other vehicles such as AVs and pedestrians are trying to take. One or more sensors of the vehicle may detect a signal from a source. The source may be another vehicle, a pedestrian, or a traffic sign. A signal may be an indication that another vehicle plans to make a lane change or a turn. One or more processors of the vehicle may determine an action, in response to detecting the signal. The action may be yielding to the another vehicle.

Figure 1:
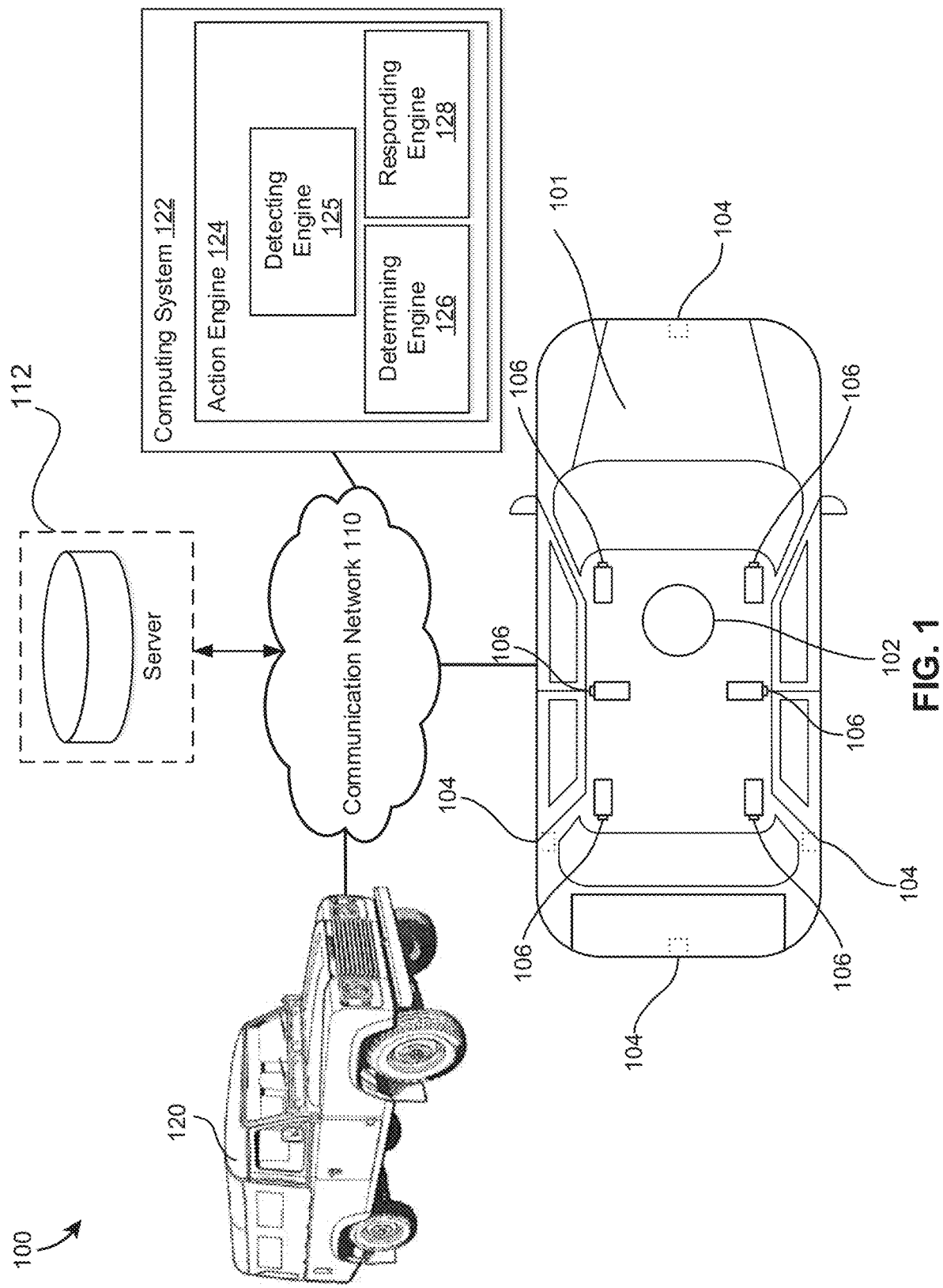
FIG. 1 illustrates an example environment of a system that detects a signal from a source, determines an intended action of a vehicle in response to detecting the signal, sends, to the source, a response signal indicative of the intended action, and takes the intended action based on the response to the response signal, and in response to determining that the source has sent a response, according to an embodiment of the present disclosure.

FIG. 1 illustrates an example environment 100 of a system that detects a signal from a source, determines an intended action of the vehicle in response to the detected signal, sends a response signal indicative of the intended action, and takes the intended action based on an existence and nature of the response signal, according to an embodiment of the present disclosure. In FIG. 1, a vehicle such as an autonomous vehicle 101 may include myriad sensors (LiDAR sensors 102, radar sensors 104, cameras 106, GPS, sonar, ultrasonic, IMU (inertial measurement unit), accelerometers, gyroscopes, magnetometers, and FIR (far infrared) sensors) to detect and identify objects in the surrounding. The sensor data may comprise pictorial or image data (e.g., pictures, videos), audio data, audiovisual data, atmospheric data (e.g., temperature, pressure, elevation, and/or the like) captured in either real-time or with a time delay. For example, the LiDAR sensors 102 can generate a three-dimensional map of the environment. The LiDAR sensors 102 can also detect objects in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs (e.g., speed limit, school zone, construction zone, etc.) and traffic lights (e.g., red light, yellow light, green light, flashing red light, etc.). The vehicle 101 can also include myriad actuators to propel and navigate the vehicle 101 in the surrounding. Such actuators may include, for example, any suitable electro-mechanical devices or systems to control a throttle response, a braking action, a steering action, etc. In some embodiments, based on image data captured by the cameras 106, the vehicle 101 can adjust vehicle speed based on speed limit signs posted on roadways. For example, the vehicle 101 can maintain a constant, safe distance from a vehicle ahead (e.g., adaptive cruise control). In this example, the vehicle 101 maintains this safe distance by constantly adjusting its vehicle speed to that of the vehicle ahead.

In various embodiments, the vehicle 101 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships (e.g., distances between objects and itself), detect and analyze road signs just as the human driver. Moreover, the vehicle 101 can perform more complex operations, such as parallel parking, parking in a crowded parking lot, collision avoidance, etc., without any human input.

The vehicle 101 may be connected, via a communication network 110, to at least one computing system 122 that includes one or more processors and memory. The one or more processors may be configured to perform various operations by interpreting machine-readable instructions. In some embodiments, the example environment 100 may be implemented as a data platform. In some embodiments, the example environment 100 may be configured to interact with computing systems of the data platform. In various embodiments, one or more computing systems of the data platform may receive and process search queries to obtain sensor data, process the sensor data, determine a action, and/or perform the action such as a driving action.

In some embodiments, the computing system 122 may include an action engine 124 that may control operations of or relating to the sensors such as the LiDAR sensors 102, radar systems 104 and cameras 106, and performing an action in response to detecting a signal. The action engine 124 may include a detecting engine 125, a determining engine 126 and a responding engine 128. The action engine 124 may be executed by the processor(s) of the computing system 122 to perform various operations including those operations described in reference to the detecting engine 125, the determining engine 126 and the responding engine 128. In general, the action engine 124 may be implemented, in whole or in part, as software that is capable of running on one or more computing devices or systems. In one example, the action engine 124 may be implemented as or within a software application running on one or more computing devices (e.g., user or client devices) and/or one or more servers (e.g., network servers or cloud servers, servers 112). In some instances, various aspects of the detecting engine 125, the determining engine 126 and the responding engine 128 may be implemented in one or more computing systems and/or devices. In some instances, one or more of the detecting engine 125, the determining engine 126 and the responding engine 128 may be combined or integrated into a single processor, and some or all functions performed by one or more of the detecting engine 125, the determining engine 126 and the responding engine 128 may not be spatially separated, but instead may be performed by a common processor. The environment 100 may also include one or more servers 112 accessible to the computing system 122. The one or more servers 112 may store sensor data from the vehicle 101, one or more sensors of other vehicles such as another vehicle 120, which may be an AV, one or more satellite maps, and/or one or more road sensors such as sensors on traffic lights. In some embodiments, the one or more servers 112 may integrate data from different sensors. In other embodiments, the one or more servers 112 may keep the data from the different sensors separate. The one or more servers 112 may be accessible to the computing system 122 either directly or over the communication network 110. In some embodiments, the one or more servers 112 may store data that may be accessed by the determining engine 126 and the responding engine 128 to provide the various features described herein. In some embodiments, the one or more servers 112 may store data that may be accessed by the another vehicle 120. As an example, data from the action engine 124 may be stored in the one or more servers 112 and accessed by the another vehicle 120. The another vehicle 120 may also acquire data from the vehicle 101, either directly in an ad-hoc network, or through the one or more servers 112. In some instances, the one or more servers 112 may include federated data stores, databases, or any other type of data source from which data may be stored and retrieved, for example. In some implementations, the one or more servers 112 may include various types of data sets on which determinations of accuracy or consistency with other information can be made. In general, a user operating a computing device can interact with the computing system 122 over the communication network 110, for example, through one or more graphical user interfaces and/or application programming interfaces.

The detecting engine 125 may be configured to process data acquired from the sensors such as the LiDAR sensors 102, radar systems 104 and cameras 106, and detect a signal from a source (e.g., another vehicle such as the another vehicle 120, a pedestrian, or a road sign). In some embodiments, the signal may be a flashing light, a flashing row of lights, a blinking light, or a blinking row of lights on a side of the source facing the vehicle 101. The flashing or blinking light or the flashing or blinking row of lights may indicate that the source intends to overtake the vehicle 101 and to switch into a lane occupied by the vehicle 101, at a position in front of the vehicle 101. The detecting engine 125, in some embodiments, may be configured to determine a relative position of the source with respect to the vehicle 101. For example, the detecting engine 125 may be configured to determine whether the vehicle 101 is completely in front of or completely behind the source, with respect to a travelling or driving direction of the vehicle 101. If the source is not completely in front of or completely behind the vehicle 101 (for example, if a back portion of the vehicle 101 is aligned with a front portion of a source, and the vehicle 101 and the source), the detecting engine 125 may detect a lateral movement of the source even if the source does not signal. The lateral movement may be a movement from a lane occupied by the source towards a lane occupied by the vehicle 101, in a direction perpendicular to the driving direction of the vehicle 101. In some examples, the detecting engine 125 may detect whether a distance of a lateral movement, or how much the source has decreased its lateral distance from the vehicle 101, is above a threshold. In such a manner, the detecting engine 125 may be configured to detect whether a source (e.g., the another vehicle 120) is intending to overtake the vehicle 101 and to make a lane change, even when the source does not provide a signal, which may occur when the source has broken signals (e.g., lights not working). In some embodiments, the detecting engine 125 may only detect a lateral movement of a source if the source is not completely in front of or behind the vehicle 101, or if the source is within a field of view of the vehicle 101. In some embodiments, the detecting engine 125 may further be configured to detect pedestrians or people, for example, crossing a street. The detecting engine 125 may further be configured to recognize walking movements of pedestrians or people, and to recognize hand gestures or hand signals from pedestrians such as an upraised hand to indicate that the pedestrian is intending to cross a street. The detecting engine 125 may further be configured to detect and distinguish bicycles and motorcycles from other vehicles.

In response to the detecting engine 125 detecting a signal, the determining engine 126 may determine an intended action of the vehicle 101 and confirm whether or not to take the intended action of the vehicle 101. In some embodiments, in response to the detecting engine 125 detecting that a source (e.g., the another vehicle 120) intends to overtake the vehicle 101 and change into the lane occupied by the vehicle 101, the determining engine 126 may determine whether or not the intended action is to yield to the source (e.g., slowing down to allow the another vehicle 120 to merge into the lane occupied by the vehicle 101). In some embodiments, yielding comprises slowing down until the source is completely in front of the vehicle 101. In some embodiments, the determining whether or not to yield to the source may be based on any of a safety of yielding, whether it is possible for the source to fit into the lane occupied by the vehicle 101, how much additional time yielding to the source may consume or is predicted to consume, such as whether or not yielding is predicted to result in the vehicle 101 having to wait at or being stuck at a red light, an urgency or a priority of the source and of other vehicles behind the vehicle 101, and whether allowing the source to enter into the lane occupied by the vehicle 101 would, or is predicted to, result in a traffic imbalance or congestion in the lane occupied by the vehicle 101.

In some embodiments, the determining engine 126 may determine potential intended actions of the vehicle and select one or more intended actions, from the potential intended actions of the vehicle, that consumes a least amount of resources, such as electricity, fuel, time, or system memory consumption, and/or has a least amount of interference with one or more other vehicles or pedestrians. In some examples, if the another vehicle 120 has signaled an intent to change into the lane occupied by the vehicle 101, the vehicle 101 may determine whether yielding to the another vehicle 120 is predicted to cause delay for the vehicle 101 and surrounding traffic such as traffic behind the vehicle 101, such as causing the vehicle 101 and surrounding traffic travelling in a same lane as the vehicle 101, to get caught in a red light.

In some embodiments, the determining engine 126 may be configured to determine whether to respond to two signals from two respective sources with a single intended action. In some examples, if another vehicle on a right side of the vehicle 101, and another vehicle on a left side of the vehicle 101 have both signaled intentions to overtake the vehicle 101 and to merge into the lane occupied by the vehicle 101, the determining engine 126 may determine whether or not to yield to both vehicles, only one of the two vehicles, or yield to none of the vehicles. In some examples, the determining engine 126 may determine to yield to only one of the two vehicles. For example, if the determining engine 126 determines that enough space in front of the vehicle 101 exists for only one more vehicle but not for two more vehicles, then the determining engine 126 may determine to yield to only one of the two vehicles. The determining engine 126 may select which one of the two vehicles to yield to based on a priority of each of the two vehicles. In some examples, the determining engine 126 may select one of the two vehicles to yield to based on which vehicle signaled first, a current location of the two vehicles relative to the vehicle 101, an intended destination of the two vehicles, which vehicle more urgently needs to merge into the lane occupied by the vehicle 101, and a type of each of the vehicles. For example, the determining engine 126 may select the vehicle that signaled first, to allow to yield into the lane occupied by the vehicle 101. In other examples, the determining engine 126 may select the vehicle that is in front, and therefore has a shorter distance to travel in order to overtake the vehicle 101. In other examples, the determining engine 126 may select the vehicle that needs to change lanes to exit a highway urgently, or make a turn at an intersection, rather than a vehicle that is merely trying to change lanes to get to a faster lane such as a lane with less traffic or faster driving vehicles. In other examples, the determining engine 126 may select the vehicle that is smaller to allow to yield into the lane occupied by the vehicle 101. In other examples, the determining engine 126 may select one of the two vehicles based on traffic in respective lanes occupied by the two vehicles. For example, if a left lane has more traffic congestion ahead compared to a right lane, the determining engine 126 may select the vehicle currently occupying the right lane because it may be easier for the vehicle currently occupying the right lane to overtake the vehicle 101.

In some embodiments, if another vehicle such as the another vehicle 120 tries to force itself into the lane occupied by the vehicle 101, despite the determining engine 126 not providing a response signal indicating that the vehicle 101 intends to yield, the determining engine 126 may take an action such as slowing down or stopping, in order to prevent an accident, and provide an audio or visual alert to vehicles behind the vehicle 101.

In some embodiments, the determining engine 126 may further be configured to determine whether to yield to one or more pedestrians, bicyclists, and/or motorcyclists. In some embodiments, the determining engine 126 may automatically determine to yield to a pedestrian if a predicted path of the pedestrian, based on a movement trajectory of the pedestrian, is within a threshold distance of a predicted path of the vehicle 101, no matter whether or not the pedestrian has signaled. In some embodiments, the determining engine 126 may automatically determine to yield to a bicycle if a predicted path of the bicycle, based on a movement trajectory of the bicycle, is within a threshold distance of a predicted path of the vehicle 101, no matter whether or not the bicyclist has signaled. In some embodiments, the determining engine 126 may automatically determine to yield to a motorcycle if a predicted path of the motorcycle, based on a movement trajectory of the motorcycle, is within a threshold distance of a predicted path of the vehicle 101, no matter whether or not the motorcyclist has signaled.

In response to the determining engine 126 determining an intended action, the determining engine 126 may send a response signal indicating the intended action to the source, in some embodiments. In some embodiments, if the intended action is yielding to a source, the determining engine 126 may, as the response signal, shine a pulsed light moving back and forth or side or side, on a side of the vehicle 101 nearest the source. In some embodiments, the determining engine 126 may adjust a brightness or a frequency of the response signal, such as the pulsed light moving back and forth, depending on a weather and/or visibility condition. As an example, during nighttime the determining engine 126 may increase the brightness and/or the frequency (e.g., speed at which the pulsed light moves back and forth) compared to the brightness and/or frequency during daytime. As another example, during inclement weather such as rain, hail, snow, hurricane, or tornado, the determining engine 126 may increase the brightness and/or the frequency.

In some examples, if the source is the another vehicle 120 that is on a right side of the vehicle 101, the determining engine 126 may shine a pulsed light moving back and forth on the right side of the vehicle. In some examples, if multiple sources from different sides are detected by the detecting engine 125, the determining engine 126 may send a response signal from each of the different sides. If the multiple sources include other vehicles on a left side and a right side of the vehicle 101, the determining engine 126 may shine a pulsed light moving back and forth on both the left side and the right side of the vehicle 101. In some examples, if the source is a pedestrian in front of the vehicle 101, the determining engine 126 may shine a pulsed light moving back and forth on a front of the vehicle 101.

After the determining engine 126 has sent a response signal to the source, the detecting engine 125 may further determine whether the source has sent a response to the response signal. In some examples, the response to the response signal may comprise the source (e.g., another vehicle 120) speeding up to overtake the vehicle 101 while continuing to signal that the source intends to merge into the same lane as the vehicle 101. The detecting engine 125 may transmit the response to the response signal to the determining engine 126.

The determining engine 126 may confirm whether or not to take the intended action based on the response to the response signal. In some examples, the determining engine 126 may predict one or more responses to the response signal. The determining engine 126 may determine whether the response to the response signal matches one of the predicted one or more responses. For example, the determining engine 126 may predict that one or more responses to the response signal (e.g., indication of yielding) includes the source (e.g., another vehicle 120) speeding up to overcome the vehicle 101 while continuing to signal, or that the source flashes a light or moves a light pattern in a specific configuration back and forth. If the response, by the another vehicle 120, to the response signal is that the another vehicle 120 does indeed speed up and/or continue to signal, the determining engine 126 may determine that the response to the response signal does match one the predicted response, and confirm to take the intended action of yielding (e.g., slowing down the vehicle 101). In another example, if the determining engine 126 has sent a response signal to a walking pedestrian in front of the vehicle 101, the determining engine 126 may predict that one or more responses to the response signal (e.g., indication of yielding) includes the source (e.g., pedestrian) walking past the vehicle 101, perpendicular to a driving direction of the vehicle 101. If the pedestrian does walk past the vehicle 101, perpendicular to a driving direction of the vehicle 101 the determining engine 126 may determine that the response to the response signal does match one the predicted response, and confirm to take the intended action of yielding to the pedestrian (e.g., stopping the vehicle 101).

On the other hand, if the response, by the another vehicle 120, to the response signal is that the another vehicle 120 slows down and/or stops signaling, then the determining engine 126 may determine that the response to the response signal fails to match the predicted response, and the determining engine 126 may infer that the another vehicle 120 no longer intends to overtake the vehicle 101 to merge into the lane occupied by the vehicle 101. Similarly, if the response, by the pedestrian, to the response signal is that the pedestrian stops walking and/or walks parallel to a driving direction of the vehicle 101, then the determining engine 126 may determine that the response to the response signal fails to match the predicted response, and the determining engine 126 may infer that the pedestrian does not intend to walk past the vehicle 101. In such scenarios, the determining engine 126 may determine not to take the intended action of yielding. In some embodiments, if the determining engine 126 determines that the response to the response signal fails to match the predicted response, the determining engine 126 may resend the response signal to the source (e.g., another vehicle 120, or a pedestrian).

If the detecting engine 125 fails to detect any response to the response signal, or if the response to the response signal fails to match one or more of the predicted responses, the determining engine 126 may resend the response signal. In some examples, the determining engine 126 may resend the response signal at an increased brightness and/or frequency to make sure what the intention of the source is. The determining engine 126 may further determine whether the pedestrian is blind. In response to the determining engine 126 determining that the pedestrian is blind, the determining engine 126 may send an audio signal rather than a visual signal to the pedestrian.

After the determining engine 126 resends the response signal to the source, the detecting engine 125 may detect or determine whether the source has sent a response to the resent response signal. In response to the detecting engine 125 determining that the source has not sent a response, the determining engine 126 may determine not to take the intended action (e.g., yielding), and may determine to continue driving at normal speed and/or normal mode. In response to the detecting engine 125 determining that the source has sent a response, the determining engine 126 may determine whether the response matches one of the predicted responses as explained above, and determines or confirms whether to take the intended action based on whether the response matches one of the predicted responses. In response to the determining engine 126 determining that the response to the response signal does not match one or more of the predicted responses, the determining engine 126 may determine an alternative action or intended action, such as selecting from another of the potential intended actions of the vehicle with a second least amount of resources consumed, and/or has a second least amount of interference with other vehicles or pedestrians.

FIGS. 2-9 illustrate exemplary implementations of the system, according to embodiments of the present disclosure. Any reference to a vehicle performing a determination or taking an action may be understood to mean that one or more processors of the vehicle may perform the determination or take the action.

Figure 2:
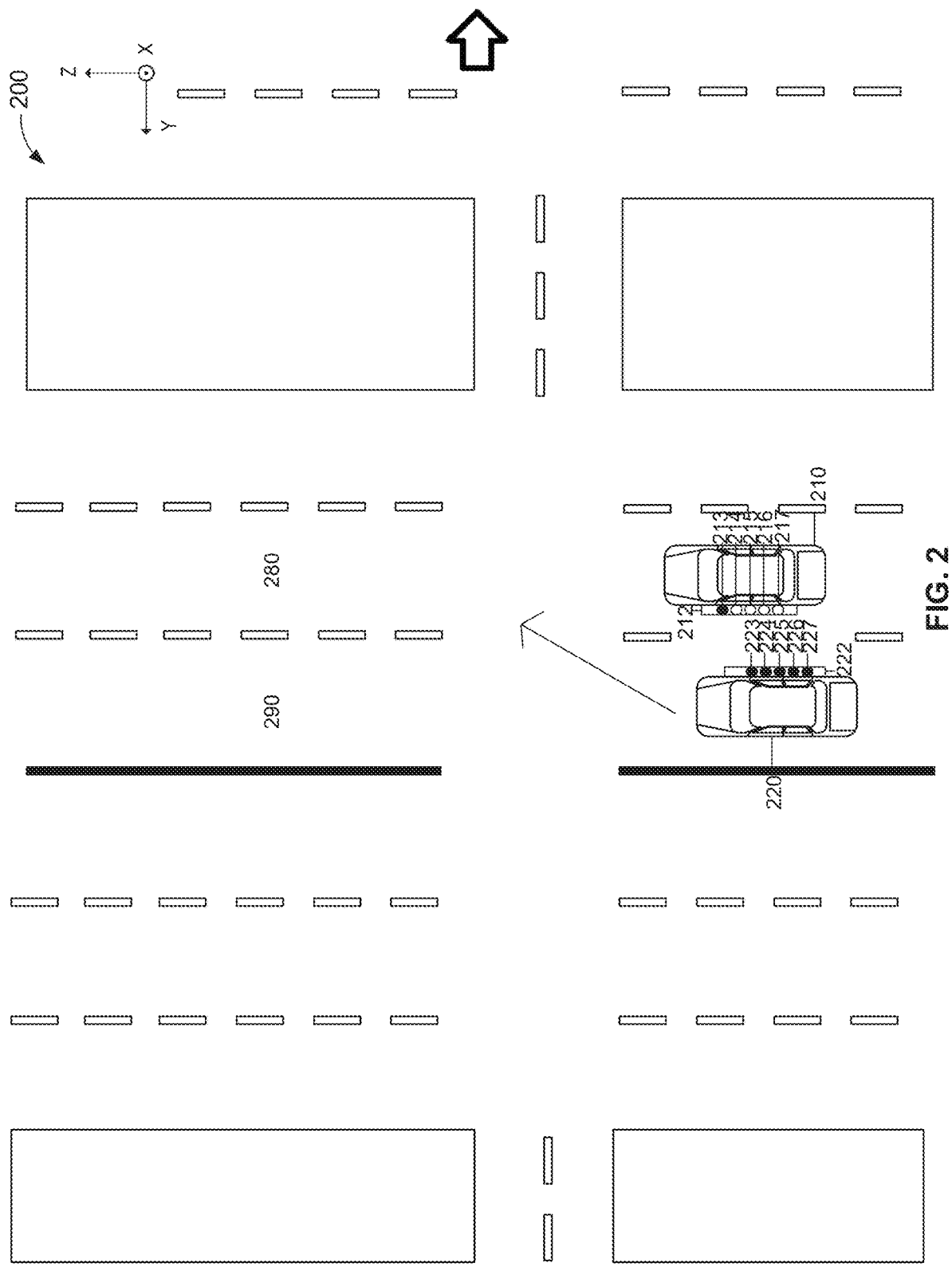
FIGS. 2-9 illustrate exemplary implementations of the system, according to an embodiment of the present disclosure.
Figure 2:
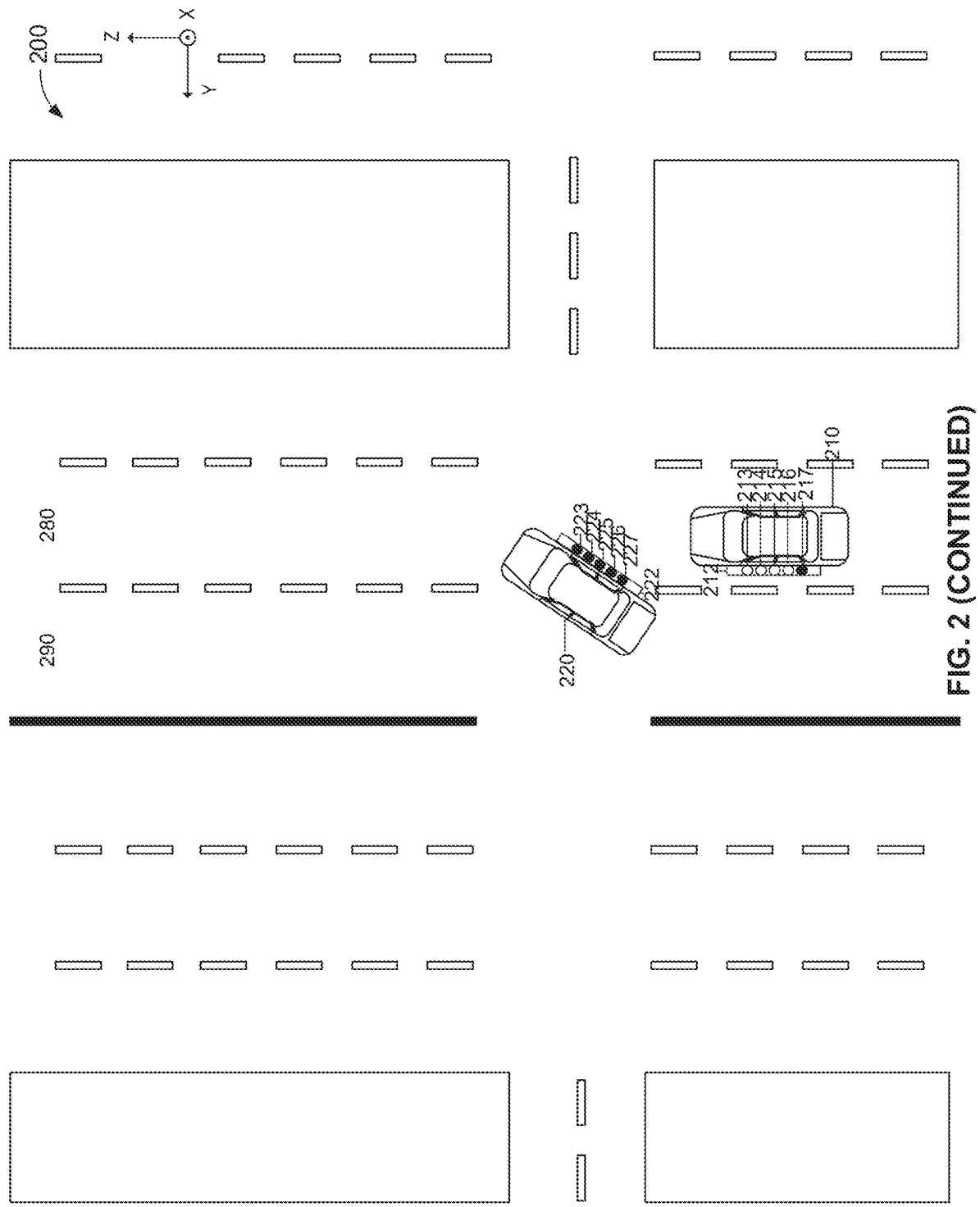

In the implementation 200 of FIG. 2, a vehicle 210, which may be implemented as vehicle 101, may be driving in a lane 280. The vehicle 210 may comprise an array 212 of lights, which may include lights 213, 214, 215, 216, and 217. In some embodiments, the array 212 may comprise any number of lights. Five lights are shown merely for illustrative purposes. Another vehicle 220, which may be an AV, may be driving in a lane 290 to a left side of the vehicle 210. The another vehicle 220 may comprise an array 222 of lights, which may include lights 223, 224, 225, 226, and 227, on a right side of the another vehicle 220, which is the side closest to the vehicle 210. In some embodiments, the array 222 may comprise any number of lights. Five lights are shown merely for illustrative purposes. The another vehicle 220 may flash or blink the array 222 of lights such that each of the lights 223, 224, 225, 226, and 227 may be flashing or blinking (shown as darkened), in order to signal to the vehicle 210 that the another vehicle 220 intends to pass or overtake the vehicle 210 and merge into the lane 280. In some embodiments, the signal from the another vehicle 220 may only be shown on a side closest to the vehicle 210. For example, no lights on a front, back, or left portion of the another vehicle 220 may be flashing or blinking. In response to the another vehicle 220 flashing or blinking the array 222 of lights, the vehicle 210 may detect and recognize, via one or more processors such as the detecting engine 125, the determining engine 126, and/or other processors, that the another vehicle 220 intends to merge into the lane 280. The vehicle 210 may be configured to recognize different patterns or sequences of flashing or blinking lights, or other signals, as signals or indications that the another vehicle 220 intends to merge into the lane 280. The vehicle 210 may, via a processor such as the determining engine 126, provide a response signal that the vehicle 210 intends to yield to the another vehicle 220 and allow the another vehicle 220 to merge into the lane 280. The response signal may be that the array 212 of lights pulses or moves from side to side or back and forth. For example, only one or only some of the lights in the array 212 may be illuminated, flashing, or flickering at one time. Initially, only the light 213 (shown as darkened) may be illuminated, flashing, or flickering; then the light 217 may be illuminated, flashing, or flickering; next, the light 216 may be illuminated, flashing, or flickering; subsequently, the light 215 may be illuminated, flashing, or flickering; then, the light 214 may be illuminated, flashing, or flickering. In some embodiments, two adjacent lights may be illuminated, flashing, or flickering at one time, as the response signal of the vehicle 210. As an example, initially, only the lights 213 and 214 may be illuminated, flashing, or flickering; then the lights 213 and 217 may be illuminated, flashing, or flickering; next, the lights 216 and 217 may be illuminated, flashing, or flickering; subsequently, the lights 215 and 216 may be illuminated, flashing, or flickering; then, the lights 214 and 215 may be illuminated, flashing, or flickering. In some embodiments, the response signal may only be shown on a side closest to the another vehicle 220. For example, no lights on a front, back, or right portion of the vehicle 210 may be illuminated, flashing, or flickering. The another vehicle 220 may be configured to detect different patterns or sequences of illuminated, flashing, or flickering lights from the vehicle 210, as a signal that the vehicle 210 intends to yield. Upon detecting that the vehicle 210 intends to yield, the another vehicle 220 may speed up to overtake the vehicle 210 and merge into the lane 280. Once the another vehicle 220 has completed merging into the lane 280, a processor such as the responding engine 128 may cause the array 212 to terminate the response signal so that none of the lights in the array 212 is illuminated, flashing, or flickering. Additionally, the another vehicle 220 may terminate the signal so that none of the lights in the array 222 of lights is illuminated, flashing, or flickering.

Figure 3:
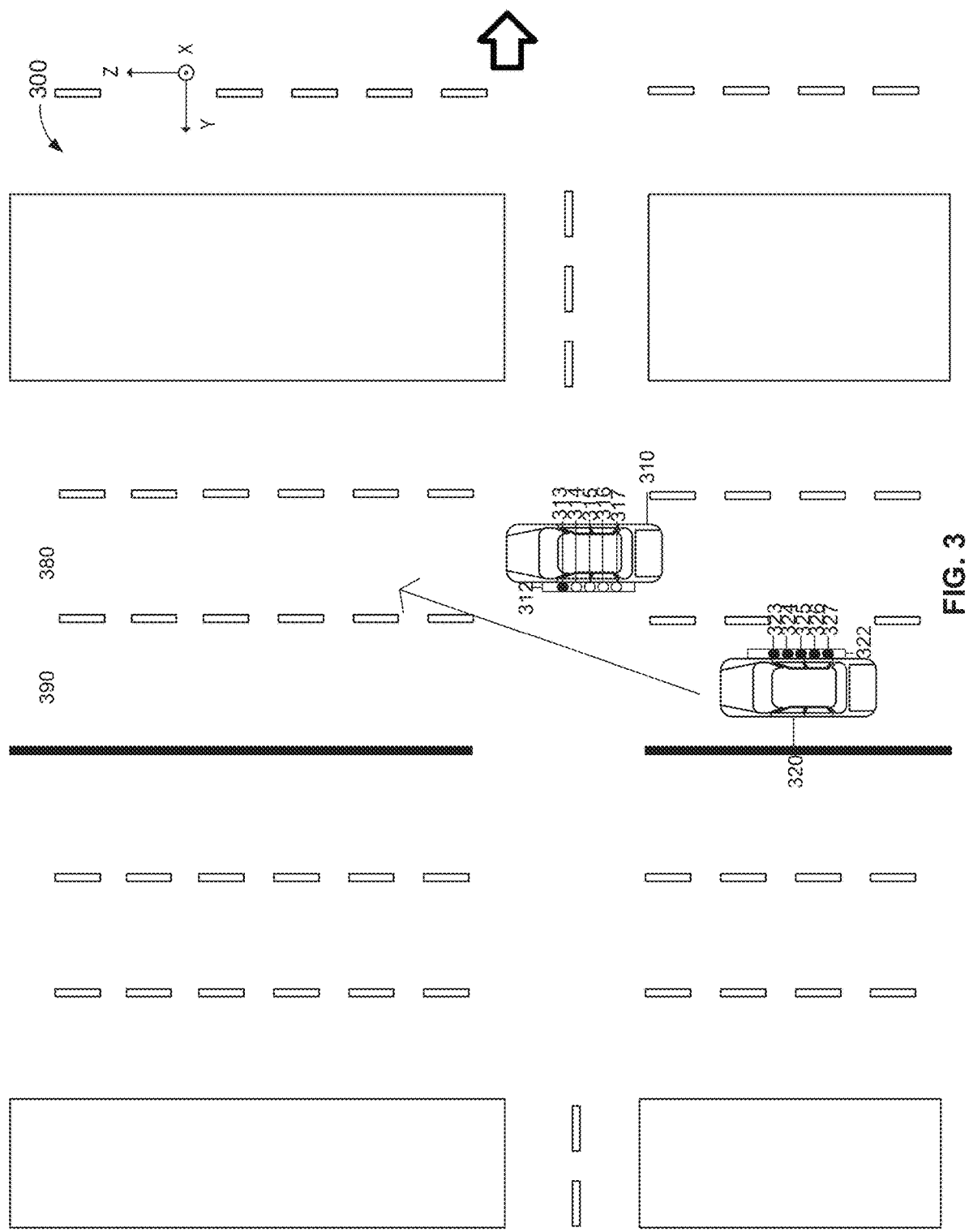
Figure 3:
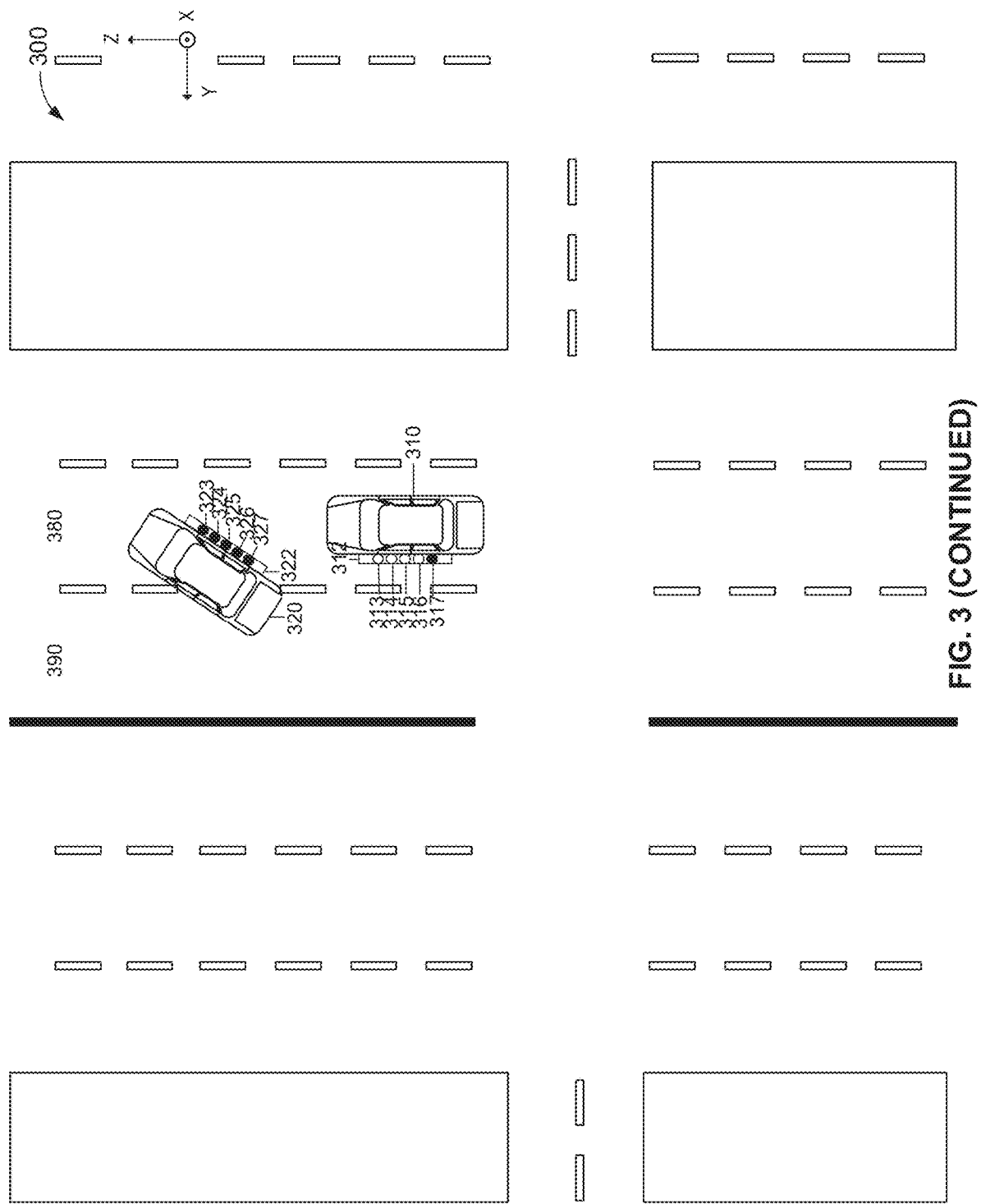

In the implementation 300 of FIG. 3, a vehicle 310, which may be implemented as vehicle 101, may be driving in a lane 380. The vehicle 310 may comprise an array 312 of lights, which may include lights 313, 314, 315, 316, and 317. In some embodiments, the array 312 may comprise any number of lights. Five lights are shown merely for illustrative purposes. Another vehicle 320, which may be an AV, may be driving in a lane 390 to a left side of the vehicle 310. The another vehicle 320 may comprise an array 322 of lights, which may include lights 323, 324, 325, 326, and 327, on a right side of the another vehicle 320, which is the side closest to the vehicle 310. In some embodiments, the array 322 may comprise any number of lights. Five lights are shown merely for illustrative purposes. The implementation of FIG. 3 may be similar to that of FIG. 2, except that the another vehicle 320 is completely behind the vehicle 310. In other words, no portion of the vehicle 310 is aligned with any portion of the another vehicle 320. The vehicle 310 may still detect the signal from the another vehicle 320 that the another vehicle 320 intends to merge into the lane 380 in front of the vehicle 310. The vehicle 310 may then determine an intended action to be yielding to the another vehicle 320, signal to the another vehicle 320 with the array 312 of lights that the vehicle 310 intends to yield, and slow down to allow the another vehicle 320 to overtake the vehicle 310.

Figure 4:
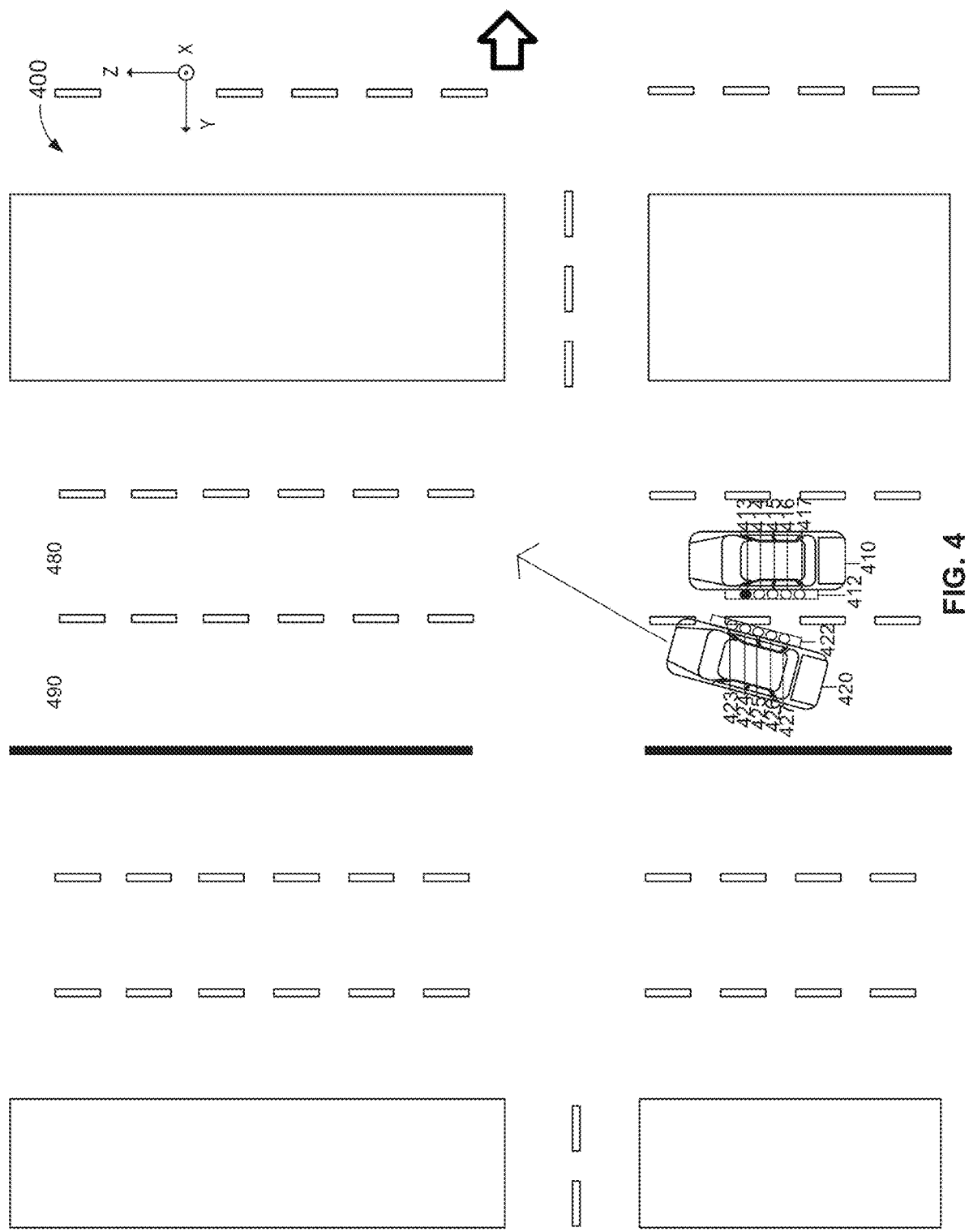
Figure 4:
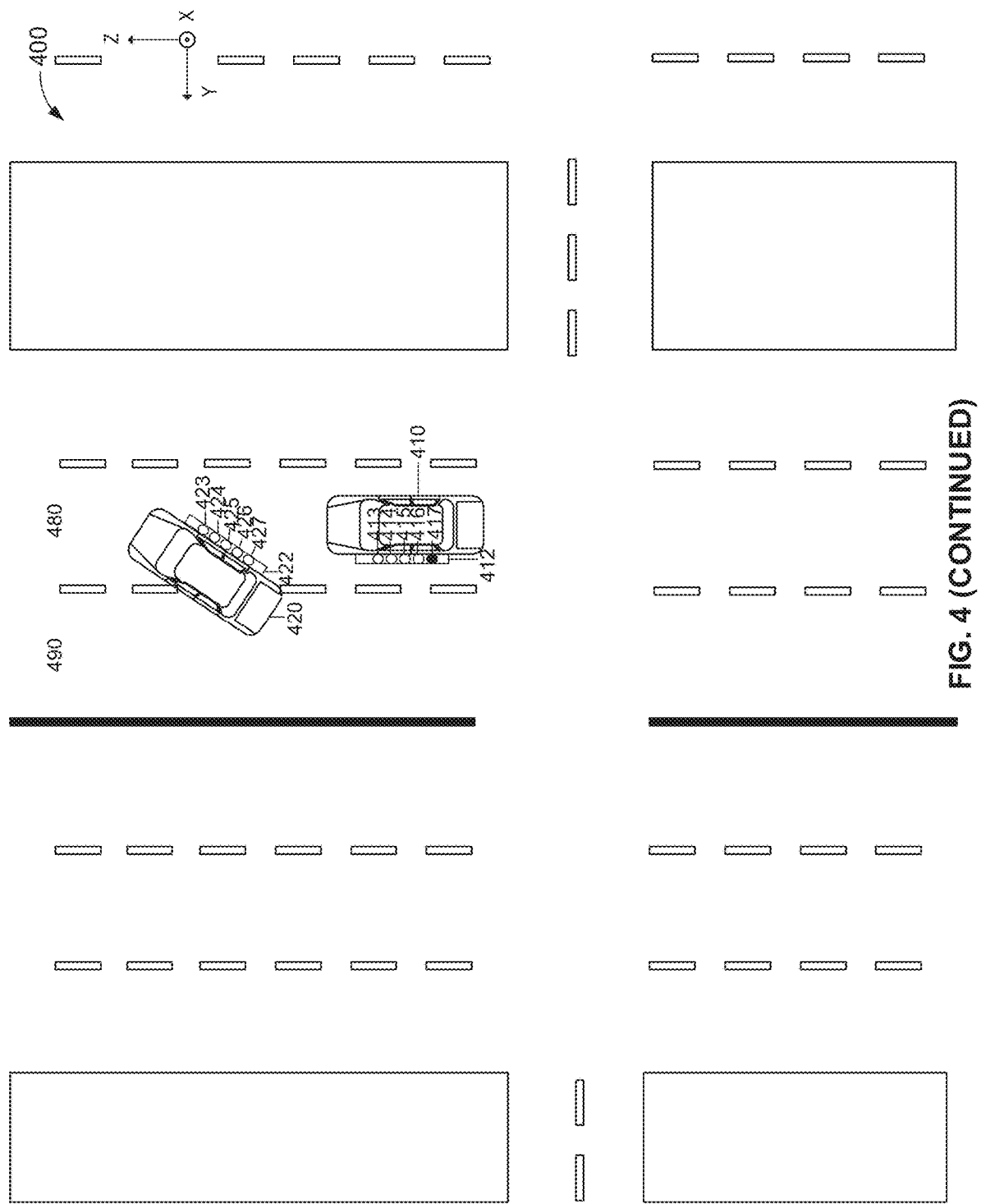

In the implementation 400 of FIG. 4, a vehicle 410, which may be implemented as vehicle 101, may be driving in a lane 480. The vehicle 410 may comprise an array 412 of lights, which may include lights 413, 414, 415, 416, and 417. In some embodiments, the array 412 may comprise any number of lights. Five lights are shown merely for illustrative purposes. Another vehicle 420, which may be an AV, may be driving in a lane 490 to a left side of the vehicle 410. The another vehicle 420 may comprise an array 422 of lights, which may include lights 423, 424, 425, 426, and 427, on a right side of the another vehicle 420, which is the side closest to the vehicle 410. In some embodiments, the array 422 may comprise any number of lights. Five lights are shown merely for illustrative purposes. The implementation of FIG. 4 may be similar to that of FIG. 2, except that the another vehicle 420 may not be signaling with the array 422 of lights. As shown in FIG. 4, the array 422 of lights is not flashing or blinking. However, the vehicle 410 may still detect a lateral movement from the another vehicle 420 towards the vehicle 410, such as a distance of a lateral movement towards the vehicle 410 that exceeds a threshold amount. The lateral movement may be in a direction perpendicular to the driving direction of the vehicle 410. The vehicle 410 may detect the lateral movement as a signal that the another vehicle 420 intends to merge into the lane 480. The vehicle 410 may then determine an intended action to be yielding to the another vehicle 420, signal to the another vehicle 420 that the vehicle 410 intends to yield with the array 412 of lights, and slow down to allow the another vehicle 420 to overtake the vehicle 410. In some embodiments, the vehicle 410 may only detect the lateral movement of a vehicle (such as another vehicle 420) if the another vehicle 420 is not completely behind or ahead of the vehicle 410. If the another vehicle 420 is completely behind or ahead of the vehicle 410, the vehicle 410 may only detect that the another vehicle 420 intends to merge into the lane 480 if the another vehicle 420 signals via the array 422.

Figure 5:
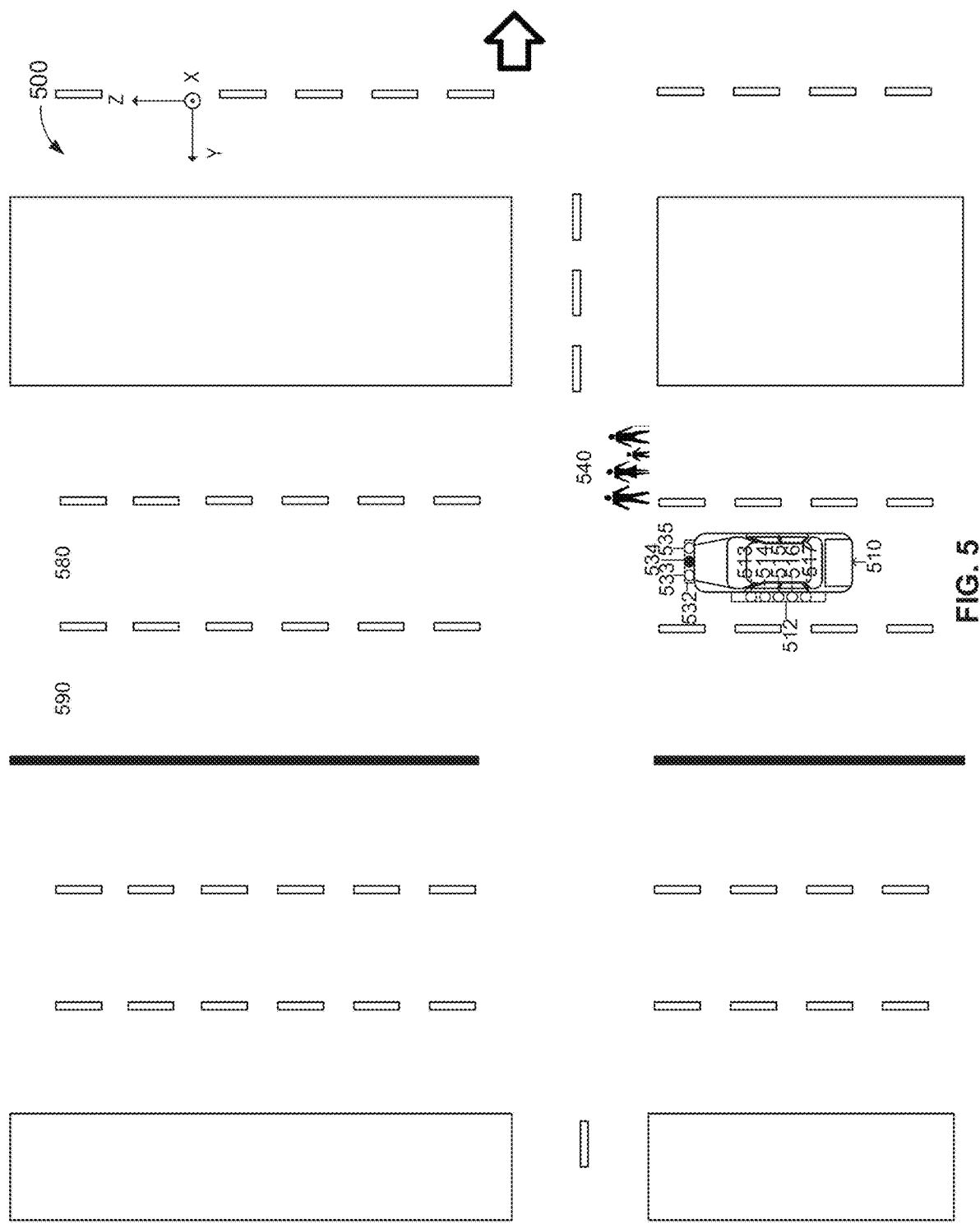

In the implementation 500 of FIG. 5, a vehicle 510, which may be implemented as vehicle 101, may be driving in a lane 580. The vehicle 510 may comprise an array 512 of lights on a left side of the vehicle 510, which may include lights 513, 514, 515, 516, and 517. In some embodiments, the array 512 may comprise any number of lights. Five lights are shown merely for illustrative purposes. The vehicle 510 may further comprise a second array 532 of lights at a front side. The second array 532 may include lights 533, 534, and 535. In some embodiments, the second array 532 may comprise any number of lights. Three lights are shown merely for illustrative purposes. In response to the one or more pedestrians 540 making a hand signal or walking onto a road, the vehicle 510 may detect and recognize, via one or more processors such as the detecting engine 125, the determining engine 126, and/or other processors, that the one or more pedestrians 540 intend to cross the road. The vehicle 510 may, via a processor such as the determining engine 126, provide a response signal that the vehicle 510 intends to yield to the one or more pedestrians 540 and allow the one or more pedestrians 540 to cross the road through the lane 580 and lane 590. The response signal may be that the second array 532 of lights pulses or moves from side to side or back and forth. For example, only one or only some of the lights in the array 532 may be illuminated, flashing, or flickering at one time. Initially, only the light 534 (shown as darkened) may be illuminated, flashing, or flickering; then the light 535 may be illuminated, flashing, or flickering; next, the light 533 may be illuminated, flashing, or flickering. In some embodiments, two adjacent lights may be illuminated, flashing, or flickering at one time, as the response signal of the vehicle 510. As an example, initially, only the lights 533 and 534 may be illuminated, flashing, or flickering; then the lights 534 and 535 may be illuminated, flashing, or flickering; next, the lights 535 and 536 may be illuminated, flashing, or flickering. In some embodiments, the response signal may only be shown on a side closest to the one or more pedestrians 540. For example, no lights on a left, back, or right portion of the vehicle 510 may be illuminated, flashing, or flickering. As seen in FIG. 5, only the second array 532 of lights may be illuminated, flashing, or flickering, and the array 512 of lights may not be illuminated, flashing, or flickering. Upon detecting that the vehicle 510 intends to yield, the one or more pedestrians 540 may cross the road. The vehicle 510 may be completely stopped while the one or more pedestrians 540 are crossing the road. Once the one or more pedestrians 540 have finished crossing the road, a processor such as the responding engine 128 may cause the array 532 to terminate the response signal so that none of the lights in the array 532 is illuminated, flashing, or flickering. The vehicle 510 may then proceed driving.

Figure 6:
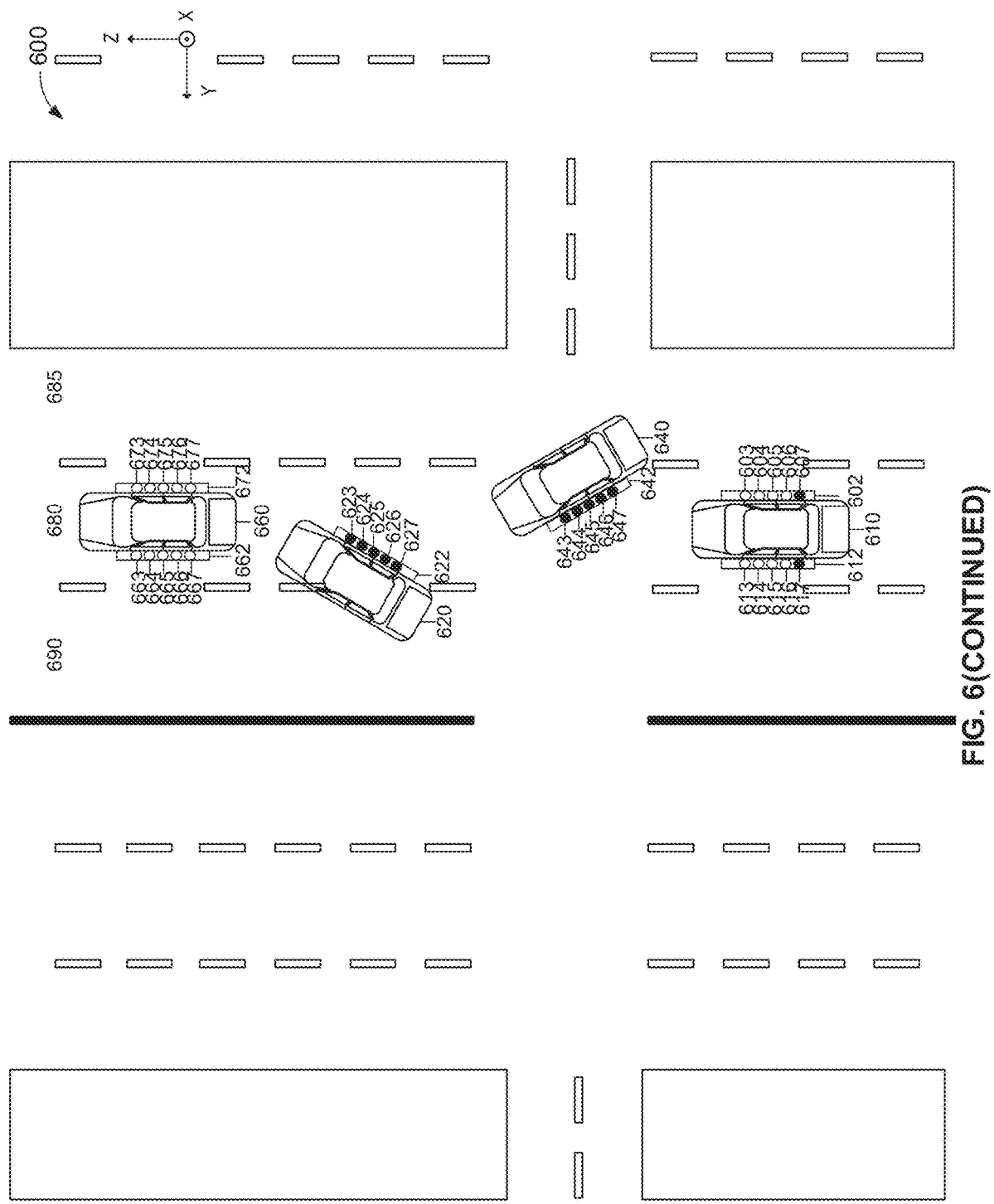

In the implementation 600 of FIG. 6, a vehicle 610, which may be implemented as vehicle 101, may be driving in a lane 680. The vehicle 610 may comprise an array 612 of lights, which may include lights 613, 614, 615, 616, and 617, on a left side of the vehicle 610, and an array 602 of lights, which may include lights 603, 604, 605, 606, and 607, on a right side of the vehicle 610. In some embodiments, the array 612 and the array 602 may comprise any number of lights. Five lights are shown merely for illustrative purposes. A second vehicle 620, which may be an AV, may be driving in a lane 690 to a left side of the vehicle 610. The second vehicle 620 may comprise an array 622 of lights, which may include lights 623, 624, 625, 626, and 627, on a right side of the second vehicle 620, which is the side closest to the vehicle 610. The second vehicle 620 may flash or blink the array 622 of lights such that each of the lights 623, 624, 625, 626, and 627 may be flashing or blinking (shown as darkened), in order to signal to the vehicle 610 that the second vehicle 620 intends to pass or overtake the vehicle 610 and merge into the lane 680. In some embodiments, the signal from the second vehicle 620 may only be shown on a side closest to the vehicle 610. For example, no lights on a front, back, or left portion of the second vehicle 620 may be flashing or blinking. A third vehicle 640, which may be an AV, may be driving in a lane 685 to a right side of the vehicle 610. The third vehicle 640 may comprise an array 642 of lights, which may include lights 643, 644, 645, 646, and 647, on a left side of the third vehicle 640, which is the side closest to the vehicle 610. The third vehicle 640 may flash or blink the array 642 of lights such that each of the lights 643, 644, 645, 646, and 647 may be flashing or blinking (shown as darkened), in order to signal to the vehicle 610 that the third vehicle 640 intends to pass or overtake the vehicle 610 and merge into the lane 680. In some embodiments, the signal from the third vehicle 640 may only be shown on a side closest to the vehicle 610. For example, no lights on a front, back, right portion or side of the third vehicle 640 may be flashing or blinking. In response to the second vehicle 620 and the third vehicle 640 flashing or blinking the arrays 622 and 642 of lights, the vehicle 610 may detect and recognize, via one or more processors such as detecting engine 125, determining engine 126, and/or other processors, that the second vehicle 620 and the third vehicle 640 intend to merge into the lane 680. The vehicle 610 may be configured to recognize different patterns or sequences of flashing or blinking lights, or other signals, as signals or indications that the second vehicle 620 and the third vehicle 640 intend to merge into the lane 680. The vehicle 610 may, via a processor such as the determining engine 126, provide a response signal that the vehicle 610 intends to yield to the second vehicle 620 and the third vehicle 640 and allow the second vehicle 620 and the third vehicle 640 to merge into the lane 680. In some embodiments, the vehicle 610 may, via the determining engine 126, determine to yield to both the second vehicle 620 and the third vehicle 630 based on determining that a distance in front of the vehicle 610 and between the vehicle 610 and a next closest vehicle (e.g., a fourth vehicle 660, which may be an AV) may be larger than a combined length of both the second vehicle 620 and the third vehicle 640. The fourth vehicle 660 may be travelling on the lane 680 and comprise an array 662 of lights, which may include lights 663, 664, 665, 666, and 667, on a left side of the fourth vehicle 660, and an array 672 of lights, which may include lights 673, 674, 675, 676, and 677, on a right side of the fourth vehicle 660.

The response signal as provided by the vehicle 610 may be that the array 612 of lights, provided in response to the signal from the second vehicle 620, and the array 602 of lights, provided in response to the signal from the third vehicle 630, pulse or move from side to side or back and forth. For example, only one or only some of the lights in the array 612 may be illuminated, flashing, or flickering at one time. Initially, only the light 613 (shown as darkened) may be illuminated, flashing, or flickering; then the light 617 may be illuminated, flashing, or flickering; next, the light 616 may be illuminated, flashing, or flickering; subsequently, the light 615 may be illuminated, flashing, or flickering; then, the light 614 may be illuminated, flashing, or flickering. In some embodiments, two adjacent lights may be illuminated, flashing, or flickering at one time, as the response signal of the vehicle 610. As an example, initially, only the lights 613 and 614 may be illuminated, flashing, or flickering; then the lights 613 and 617 may be illuminated, flashing, or flickering; next, the lights 616 and 617 may be illuminated, flashing, or flickering; subsequently, the lights 615 and 616 may be illuminated, flashing, or flickering; then, the lights 614 and 615 may be illuminated, flashing, or flickering. The array 602 may operate in a manner similar to the array 612. In some embodiments, no lights on a front or back portion of the vehicle 610 may be illuminated, flashing, or flickering. The second vehicle 620 may be configured to detect different patterns or sequences of illuminated, flashing, or flickering lights from the array 612 from the vehicle 610, as a signal that the vehicle 610 intends to yield. Upon detecting that the vehicle 610 intends to yield, the second vehicle 620 may speed up to overtake the vehicle 610 and merge into the lane 680. The third vehicle 640 may be configured to detect different patterns or sequences of illuminated, flashing, or flickering lights from the array 602 from the vehicle 610, as a signal that the vehicle 610 intends to yield. Upon detecting that the vehicle 610 intends to yield, the third vehicle 640 may speed up to overtake the vehicle 610 and merge into the lane 680. Once the second vehicle 620 and the third vehicle 640 have completed merging into the lane 680, a processor such as the responding engine 128 may cause the array 612 and the array 602 to terminate the response signal so that none of the lights in the array 612 or the array 602 are illuminated, flashing, or flickering. Additionally, the second vehicle 620 and the third vehicle 640 may terminate the signal so that none of the lights in the array 622 and the array 642 of lights are illuminated, flashing, or flickering.

Figure 7:
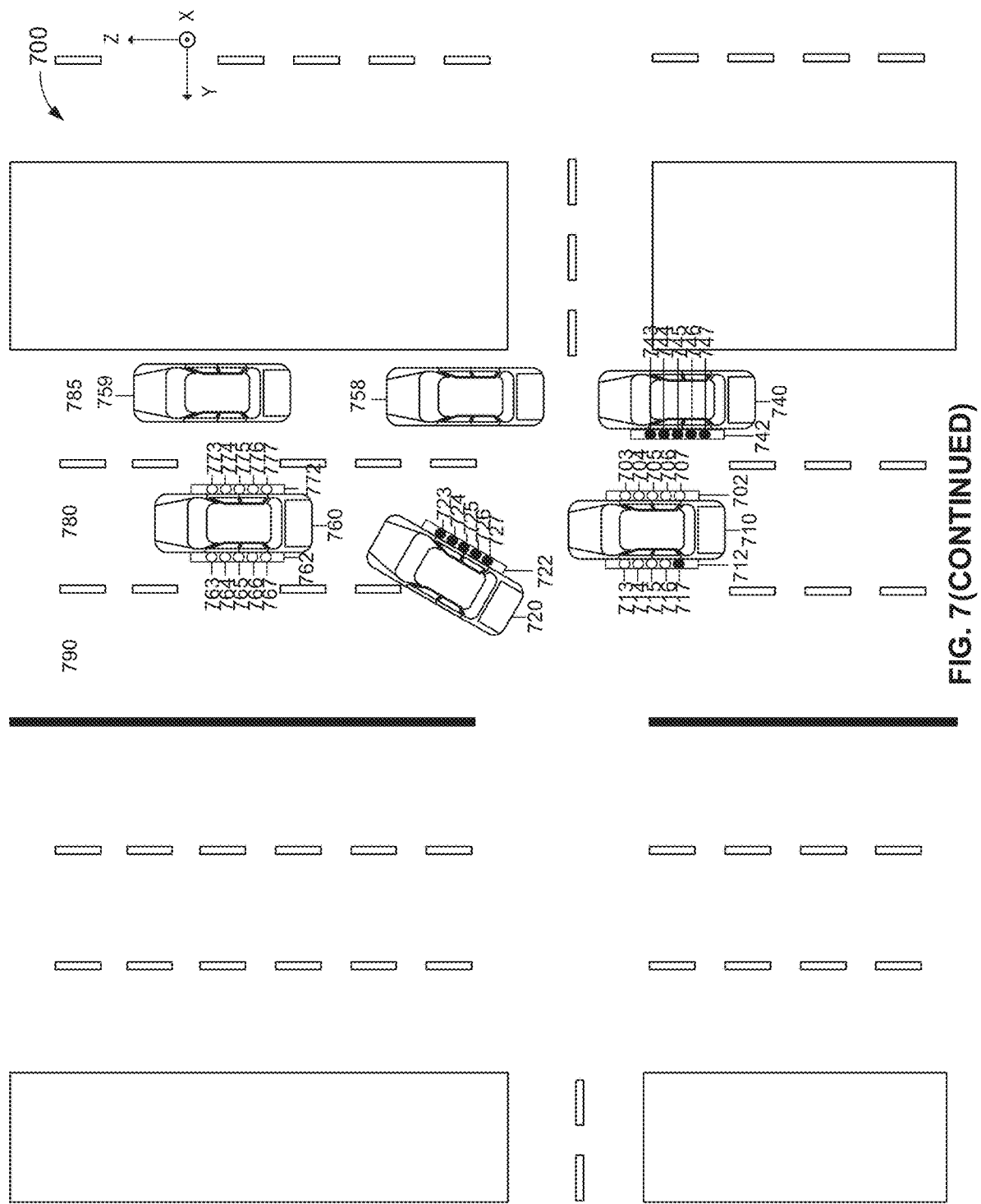

In the implementation 700 of FIG. 7, a vehicle 710, which may be implemented as vehicle 101, may be driving in a lane 780. The vehicle 710 may comprise an array 712 of lights, which may include lights 713, 714, 715, 716, and 717, on a left side of the vehicle 710, and an array 702 of lights, which may include lights 703, 704, 705, 706, and 707, on a right side of the vehicle 710. In some embodiments, the array 712 and the array 702 may comprise any number of lights. Five lights are shown merely for illustrative purposes. A second vehicle 720, which may be an AV, may be driving in a lane 790 to a left side of the vehicle 710. The second vehicle 720 may comprise an array 722 of lights, which may include lights 723, 724, 725, 726, and 727, on a right side of the second vehicle 720, which is the side closest to the vehicle 710. The second vehicle 720 may flash or blink the array 722 of lights such that each of the lights 723, 724, 725, 726, and 727 may be flashing or blinking (shown as darkened), in order to signal to the vehicle 710 that the second vehicle 720 intends to pass or overtake the vehicle 710 and merge into the lane 780. In some embodiments, the signal from the second vehicle 720 may only be shown on a side closest to the vehicle 710. For example, no lights on a front, back, or left portion of the second vehicle 720 may be flashing or blinking. A third vehicle 740, which may be an AV, may be driving in a lane 785 to a right side of the vehicle 710. The third vehicle 740 may comprise an array 742 of lights, which may include lights 743, 744, 745, 746, and 747, on a left side of the third vehicle 740, which is the side closest to the vehicle 710. The third vehicle 740 may flash or blink the array 742 of lights such that each of the lights 743, 744, 745, 746, and 747 may be flashing or blinking (shown as darkened), in order to signal to the vehicle 710 that the third vehicle 740 intends to pass or overtake the vehicle 710 and merge into the lane 780. In some embodiments, the signal from the third vehicle 740 may only be shown on a side closest to the vehicle 710. For example, no lights on a front, back, right portion or side of the third vehicle 740 may be flashing or blinking. In response to the second vehicle 720 and the third vehicle 740 flashing or blinking the arrays 722 and 742 of lights, respectively, the vehicle 710 may detect and recognize, via one or more processors such as detecting engine 125, determining engine 126, and/or other processors, that the second vehicle 720 and the third vehicle 740 intend to merge into the lane 780. The vehicle 710 may be configured to recognize different patterns or sequences of flashing or blinking lights, or other signals, as signals or indications that the second vehicle 720 and the third vehicle 740 intend to merge into the lane 780. The vehicle 710 may, via a processor such as the determining engine 126, provide a response signal that the vehicle 710 intends to yield to the second vehicle 720, but not provide a response to the third vehicle 740, indicating that the vehicle 710 is not yielding to the third vehicle 740 and not allowing the third vehicle 740 to merge into the lane 780. In some embodiments, the vehicle 710 may, via the determining engine 126, determine to yield to only the second vehicle 720 and not yield the third vehicle 730 based on determining that a distance in front of the vehicle 710 and between the vehicle 710 and a next closest vehicle (e.g., a fourth vehicle 760, which may be an AV) may not be large enough to accommodate both the second vehicle 720 and the third vehicle 740, and determining that the distance between the vehicle 710 and the fourth vehicle 760 may only be large enough to accommodate one vehicle. The fourth vehicle 760 may be travelling on the lane 780 and comprise an array 762 of lights, which may include lights 763, 764, 765, 766, and 767, on a left side of the fourth vehicle 760, and an array 772 of lights, which may include lights 773, 774, 775, 776, and 777, on a right side of the fourth vehicle 760.

To determine which of the second vehicle 720 and the third vehicle 740 to allow to merge into the lane 780, the vehicle 710 may, via the determining engine 126, choose whichever vehicle is in front, whichever vehicle has a larger distance from a next closest vehicle, and/or whichever vehicle more urgently requires a merge into the lane 780, among other factors described previously with respect to FIG. 1. Here, the determining engine 126 may determine that the second vehicle 720 is in front of the third vehicle 740, so that the second vehicle 720 may have a smaller distance to travel in order to overtake the vehicle 710. The determining engine 126 may further determine that directly in front of the third vehicle 740 are two other vehicles 758 and 759, whereas no other vehicles are directly in front of the second vehicle 720. Based at least in part on these factors, the determining engine 126 may choose the second vehicle 720 to allow to merge into the lane 780.

The response signal as provided by the vehicle 710 may be that the array 712 of lights, provided in response to the signal from the second vehicle 720, pulses or moves from side to side or back and forth, and the array 702 of lights, does not provide any signal such as pulsing or moving from side to side or back and forth, to the third vehicle 740, indicating that the vehicle 710 is not yielding to the third vehicle 740. However, if the second vehicle 720 no longer indicates a signal that the second vehicle 720 intends to merge into the lane 780, the vehicle 710 may then signal to the third vehicle 740, via the array 702, that the vehicle 710 intends to yield to the third vehicle 740.

As an example, only one or only some of the lights in the array 712 may be illuminated, flashing, or flickering at one time. Initially, only the light 713 (shown as darkened) may be illuminated, flashing, or flickering; then the light 717 may be illuminated, flashing, or flickering; next, the light 716 may be illuminated, flashing, or flickering; subsequently, the light 715 may be illuminated, flashing, or flickering; then, the light 714 may be illuminated, flashing, or flickering. In some embodiments, two adjacent lights may be illuminated, flashing, or flickering at one time, as the response signal of the vehicle 710. As an example, initially, only the lights 713 and 714 may be illuminated, flashing, or flickering; then the lights 713 and 717 may be illuminated, flashing, or flickering; next, the lights 716 and 717 may be illuminated, flashing, or flickering; subsequently, the lights 715 and 716 may be illuminated, flashing, or flickering; then, the lights 714 and 715 may be illuminated, flashing, or flickering. In some embodiments, no lights on a front or back portion of the vehicle 710 may be illuminated, flashing, or flickering. The second vehicle 720 may be configured to detect different patterns or sequences of illuminated, flashing, or flickering lights from the array 712 from the vehicle 710, as a signal that the vehicle 710 intends to yield. Upon detecting that the vehicle 710 intends to yield, the second vehicle 720 may speed up to overtake the vehicle 710 and merge into the lane 780. Once the second vehicle 720 has completed merging into the lane 780, a processor such as the responding engine 128 may cause the array 712 to terminate the response signal so that none of the lights in the array 712 are illuminated, flashing, or flickering. Additionally, the second vehicle 720 may terminate the signal so that none of the lights in the array 722 of lights are illuminated, flashing, or flickering.

Figure 8:
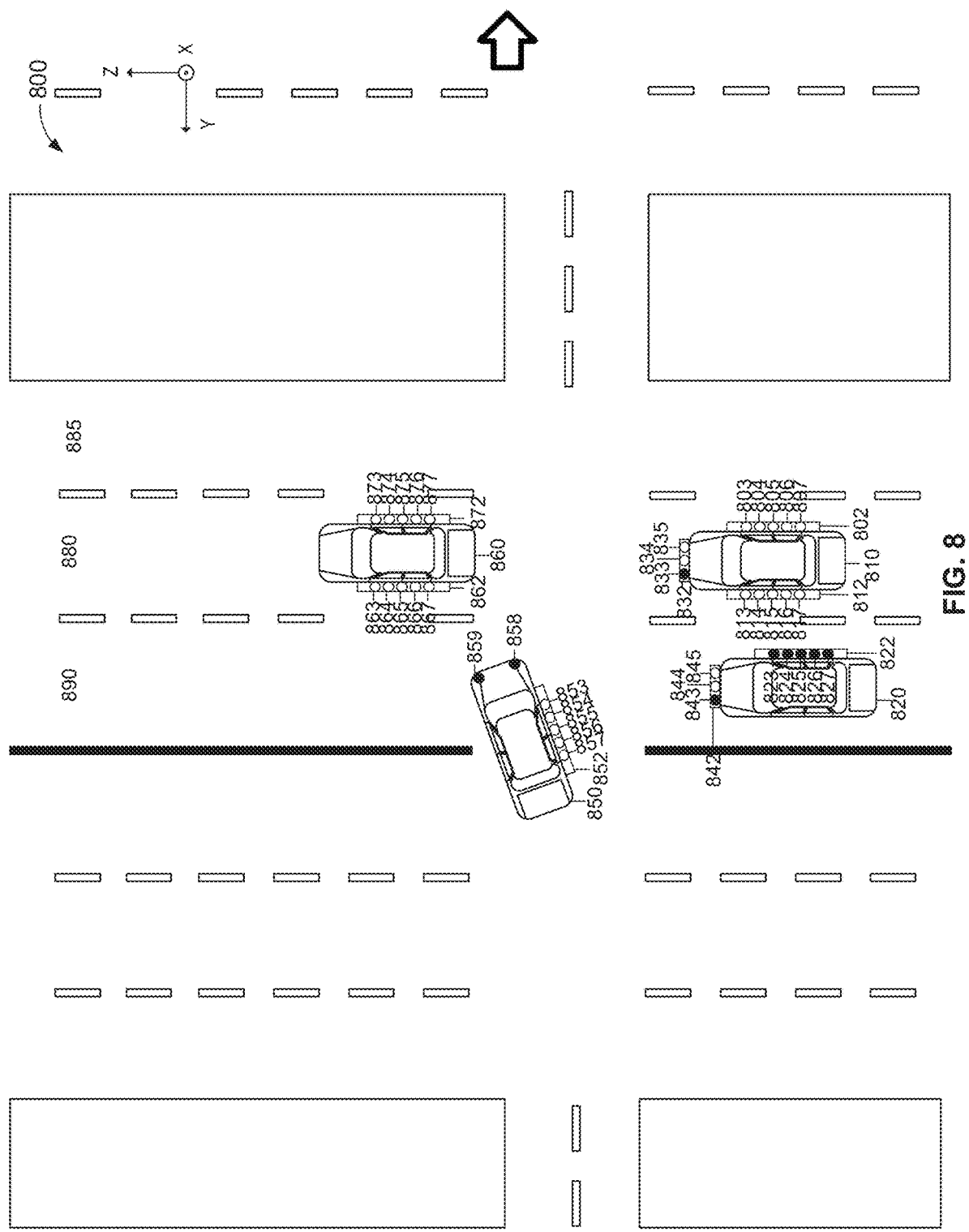
Figure 8:
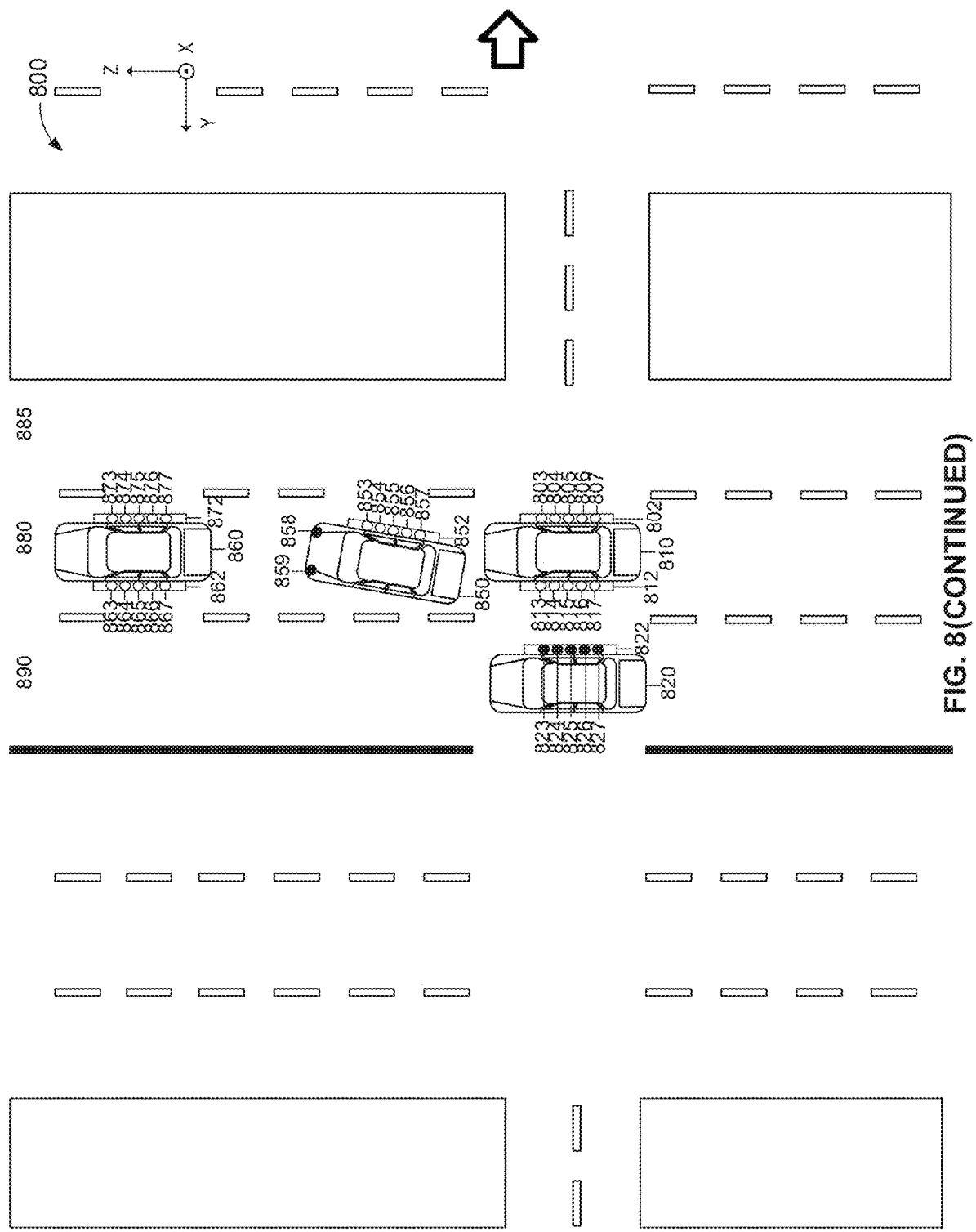

In the implementation 800 of FIG. 8, a vehicle 810, which may be implemented as vehicle 101, may be driving in a lane 880. The vehicle 810 may comprise an array 812 of lights, which may include lights 813, 814, 815, 816, and 817, on a left side of the vehicle 810, an array 802 of lights, which may include lights 803, 804, 805, 806, and 807, on a right side of the vehicle 810, and an array 832 of lights, which may include lights 833, 834, and 835, on a front portion of the vehicle 810. In some embodiments, the array 812, 802, and 832 may comprise any number of lights. Five lights in the array 812 and 802, or three lights in the array 832, are shown merely for illustrative purposes. A second vehicle 820, which may be an AV, may be driving in a lane 890 to a left side of the vehicle 810. The second vehicle 820 may comprise an array 822 of lights, which may include lights 823, 824, 825, 826, and 827, on a right side of the second vehicle 820, which is the side closest to the vehicle 810, and an array 842 of lights, which may include lights 843, 844, and 845, on a front side of the second vehicle 820. The second vehicle 820 may flash or blink the array 822 of lights such that each of the lights 823, 824, 825, 826, and 827 may be flashing or blinking (shown as darkened), in order to signal to the vehicle 810 that the second vehicle 820 intends to pass or overtake the vehicle 810 and merge into the lane 880. In some embodiments, the signal from the second vehicle 820 may only be shown on a side closest to the vehicle 810. For example, no lights on a front, back, or left portion of the second vehicle 820 may be flashing or blinking. The array 842 may operate in a similar manner as the array 822. A third vehicle 850, which may be an AV, may be turning into either the lane 890 or the lane 880. The third vehicle 850 may comprise an array 852 of lights, which may include lights 853, 854, 855, 856, and 857, on a right side of the third vehicle 850, and turn lights 858 and 859. The third vehicle 850 may flash or blink the turn lights 858 and 859 such that each of the lights 858 and 859 may be flashing or blinking (shown as darkened), in order to signal to the vehicle 810 and the second vehicle 820 that the third vehicle 850 intends to turn into the lane 880 or the lane 890. In response to the second vehicle 820 flashing or blinking the arrays 822, and the third vehicle 850 flashing or blinking the turn lights 858 and 859, the vehicle 810 may detect and recognize, via one or more processors such as detecting engine 125, determining engine 126, and/or other processors, that the second vehicle 820 and the third vehicle 850 intend to merge into the lane 880. The vehicle 810 may be configured to recognize different patterns or sequences of flashing or blinking lights, or other signals, as signals or indications that the second vehicle 820 and the third vehicle 850 intend to merge into the lane 880. Additionally, the second vehicle 820 may detect that the third vehicle 850 is flashing or blinking the turn lights 858 and 859, and may provide a signal, via the array 842 of lights, that the second vehicle 820 intends to yield to the third vehicle 850.

The vehicle 810 may, via a processor such as the determining engine 126, provide a response signal, via the array 832 of lights, that the vehicle 810 intends to yield to the third vehicle 850, but not provide a response to the second vehicle 820, indicating that the vehicle 810 is not yielding to the second vehicle 820 and not allowing the second vehicle 820 to merge into the lane 880. In some embodiments, the vehicle 810 may, via the determining engine 126, determine to yield to only the third vehicle 850 and not yield the second vehicle 820 based on determining that a distance in front of the vehicle 810 and between the vehicle 810 and a next closest vehicle (e.g., a fourth vehicle 860, which may be an AV) may not be large enough to accommodate both the second vehicle 820 and the third vehicle 850, and determining that the distance between the vehicle 810 and the fourth vehicle 860 may only be large enough to accommodate one vehicle. The fourth vehicle 860 may be travelling on the lane 880 and comprise an array 862 of lights, which may include lights 863, 864, 865, 866, and 867, on a left side of the fourth vehicle 860, and an array 872 of lights, which may include lights 873, 874, 875, 876, and 877, on a right side of the fourth vehicle 860. Additionally or alternatively, the vehicle 810 may, via the determining engine 126, determine that allowing the second vehicle 820 to merge at a same time as the third vehicle 850 is turning at an intersection is unsafe and not allow the second vehicle 820 to merge.

To determine which of the second vehicle 820 and the third vehicle 850 to allow to merge into the lane 880, the vehicle 810 may, via the determining engine 126, choose whichever vehicle is in front, and/or whichever vehicle more urgently requires a merge into the lane 880, among other factors described previously with respect to FIG. 1. Here, the determining engine 126 may determine that the third vehicle 850 is in front of the second vehicle 820, and that not allowing the third vehicle 850 to merge into the lane 880 may result in the third vehicle 850 being stuck at an intersection and potentially blocking traffic on multiple roads, so that the third vehicle 850 requires merging more urgently. Based at least in part on these factors, the determining engine 126 may choose the third vehicle 850 to allow to merge into the lane 880.

The response signal as provided by the vehicle 810 may be that the array 832 of lights, provided in response to the signal from the turn lights 858 and 859 from the third vehicle 850, pulses or moves from side to side or back and forth, and the array 802 of lights, does not provide any signal such as pulsing or moving from side to side or back and forth, to the second vehicle 820, indicating that the vehicle 810 is not yielding to the second vehicle 820. However, if the third vehicle 850 successfully merges into the lane 890, the lane 880, or the lane 885, if the determining engine 126 determines that adequate space exists in front of the vehicle 810 to allow the second vehicle 820 to merge, and conditions are otherwise safe for merging, the determining engine 126 may then signal to the second vehicle 820, via the array 812, that the vehicle 810 intends to yield to the second vehicle 820.

As an example, only one or only some of the lights in the array 832 may be illuminated, flashing, or flickering at one time. Initially, only the light 833 (shown as darkened) may be illuminated, flashing, or flickering because it is closest to the third vehicle 850. The light 833 may be the only light in the array 832 that is illuminated, flashing, or flickering. Alternatively, different lights of the array may be illuminated, flashing, or flickering at different times. For example, the light 833 may be illuminated, flashing, or flickering; next, the light 834 may be illuminated, flashing, or flickering; subsequently, the light 835 may be illuminated, flashing, or flickering. In some embodiments, two adjacent lights may be illuminated, flashing, or flickering at one time, as the response signal of the vehicle 810. As an example, initially, only the lights 833 and 834 may be illuminated, flashing, or flickering; then the lights 834 and 835 may be illuminated, flashing, or flickering; next, the lights 835 and 833 may be illuminated, flashing, or flickering. The third vehicle 850 may be configured to detect different patterns or sequences of illuminated, flashing, or flickering lights from the array 832 from the vehicle 810, as a signal that the vehicle 810 intends to yield. Upon detecting that the vehicle 810 intends to yield, the third vehicle 850 may speed up to merge into the lane 880. Once the third vehicle 850 has completed merging into the lane 880, a processor such as the responding engine 128 may cause the array 832 to terminate the response signal so that none of the lights in the array 832 are illuminated, flashing, or flickering. Additionally, the third vehicle 850 may terminate the signal so that none of the turn lights 858 or 859 are illuminated, flashing, or flickering.

Figure 9:
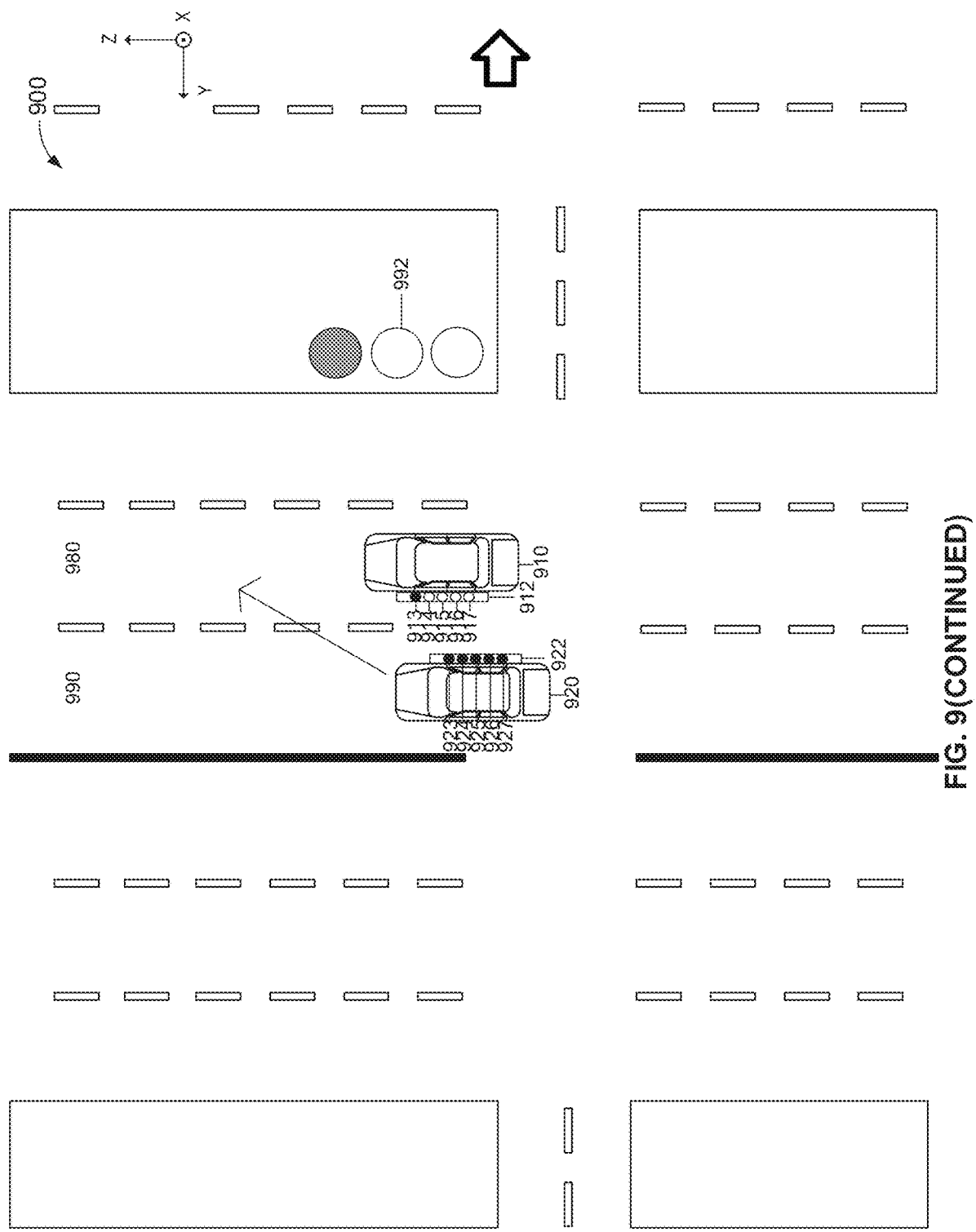
Figure 9:
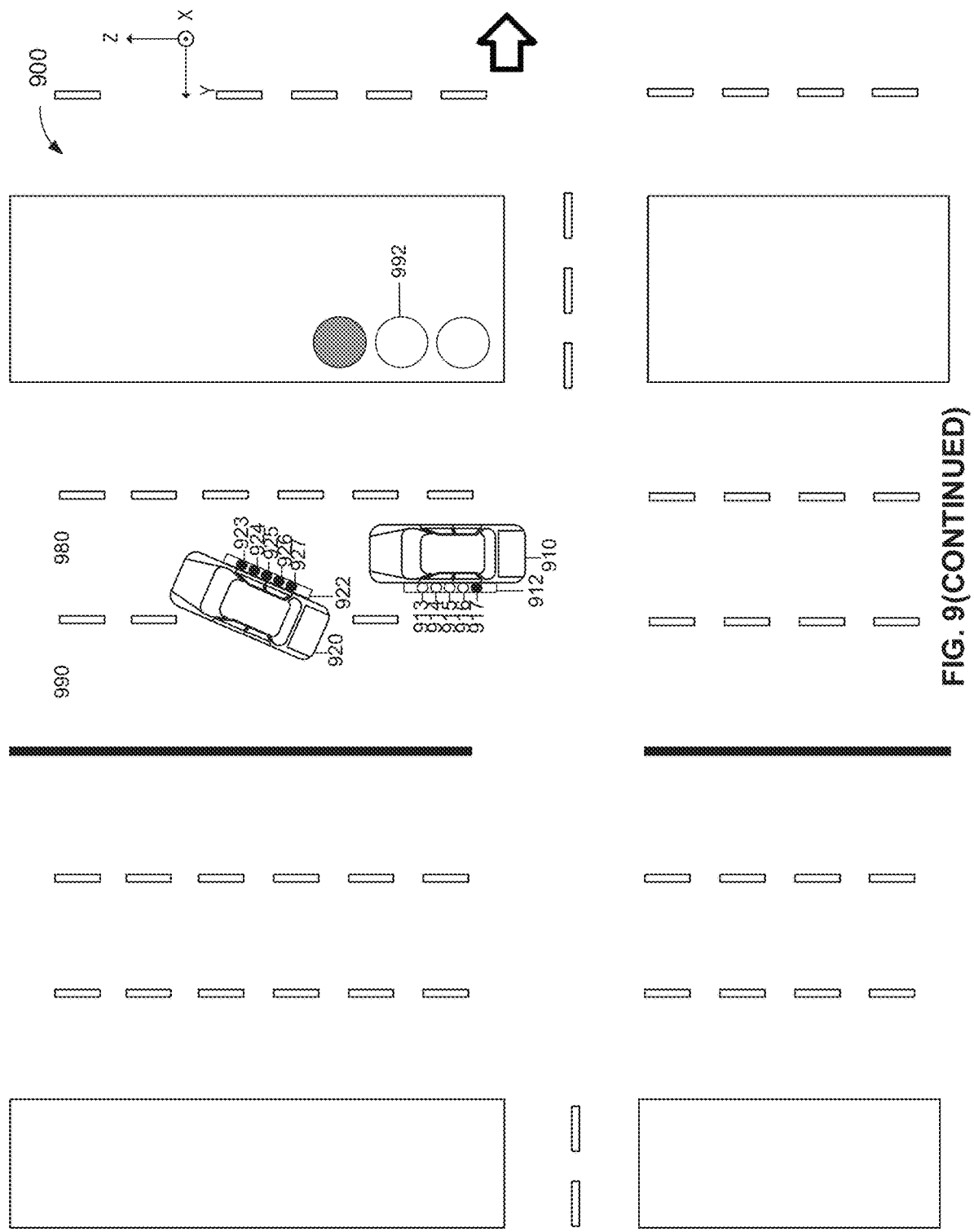

In the implementation 900 of FIG. 9, a vehicle 910, which may be implemented as vehicle 101, may be driving in a lane 980. The vehicle 910 may comprise an array 912 of lights, which may include lights 913, 914, 915, 916, and 917. In some embodiments, the array 912 may comprise any number of lights. Five lights are shown merely for illustrative purposes. Another vehicle 920, which may be an AV, may be driving in a lane 920 to a left side of the vehicle 910. The another vehicle 920 may comprise an array 922 of lights, which may include lights 923, 924, 925, 926, and 927, on a right side of the another vehicle 920, which is the side closest to the vehicle 910. In some embodiments, the array 922 may comprise any number of lights. Five lights are shown merely for illustrative purposes. The another vehicle 920 may flash or blink the array 922 of lights such that each of the lights 923, 924, 925, 926, and 927 may be flashing or blinking (shown as darkened), in order to signal to the vehicle 910 that the another vehicle 920 intends to pass or overtake the vehicle 910 and merge into the lane 980. In some embodiments, the signal from the another vehicle 920 may only be shown on a side closest to the vehicle 910. For example, no lights on a front, back, or left portion of the another vehicle 920 may be flashing or blinking. In response to the another vehicle 920 flashing or blinking the array 922 of lights, the vehicle 910 may detect and recognize, via one or more processors such as the detecting engine 125, the determining engine 126, and/or other processors, that the another vehicle 920 intends to merge into the lane 980. The vehicle 910 may be configured to recognize different patterns or sequences of flashing or blinking lights, or other signals, as signals or indications that the another vehicle 920 intends to merge into the lane 980. The vehicle 910 may, via the determining engine 126, determine whether and/or when to yield in order to allow the second vehicle 920 to merge into the lane 980. In some examples, the vehicle 910 may determine whether to allow the second vehicle 920 to merge into the lane 980 based on another source such as a traffic light signal 992. For example, if allowing the second vehicle 920 to merge into the lane 980 would be predicted to result in the vehicle 910 being caught or stuck at a red light, either immediately in front of the vehicle 910, or farther in the route (e.g., blocks or miles away), the vehicle 910 may not yield to the second vehicle 920. For example, the vehicle 910 may be approaching an intersection while the traffic light 992 is yellow. The vehicle 910 may first pass the intersection with the traffic light 992 before the traffic light 992 turns red, and then, via a processor such as the determining engine 126, provide a response signal to the second vehicle 920 that the vehicle 910 intends to yield.

The response signal may be that the array 912 of lights pulses or moves from side to side or back and forth. For example, only one or only some of the lights in the array 912 may be illuminated, flashing, or flickering at one time. Initially, only the light 913 (shown as darkened) may be illuminated, flashing, or flickering; then the light 917 may be illuminated, flashing, or flickering; next, the light 916 may be illuminated, flashing, or flickering; subsequently, the light 915 may be illuminated, flashing, or flickering; then, the light 914 may be illuminated, flashing, or flickering. In some embodiments, two adjacent lights may be illuminated, flashing, or flickering at one time, as the response signal of the vehicle 910. As an example, initially, only the lights 913 and 914 may be illuminated, flashing, or flickering; then the lights 913 and 917 may be illuminated, flashing, or flickering; next, the lights 916 and 917 may be illuminated, flashing, or flickering; subsequently, the lights 915 and 916 may be illuminated, flashing, or flickering; then, the lights 914 and 915 may be illuminated, flashing, or flickering. In some embodiments, the response signal may only be shown on a side closest to the another vehicle 920. For example, no lights on a front, back, or right portion of the vehicle 910 may be illuminated, flashing, or flickering. The another vehicle 920 may be configured to detect different patterns or sequences of illuminated, flashing, or flickering lights from the vehicle 910, as a signal that the vehicle 910 intends to yield. Upon detecting that the vehicle 910 intends to yield, the another vehicle 920 may speed up to overtake the vehicle 910 and merge into the lane 980. Once the another vehicle 920 has completed merging into the lane 980, a processor such as the responding engine 128 may cause the array 912 to terminate the response signal so that none of the lights in the array 912 is illuminated, flashing, or flickering. Additionally, the another vehicle 920 may terminate the signal so that none of the lights in the array 922 of lights is illuminated, flashing, or flickering.

Figure 10:
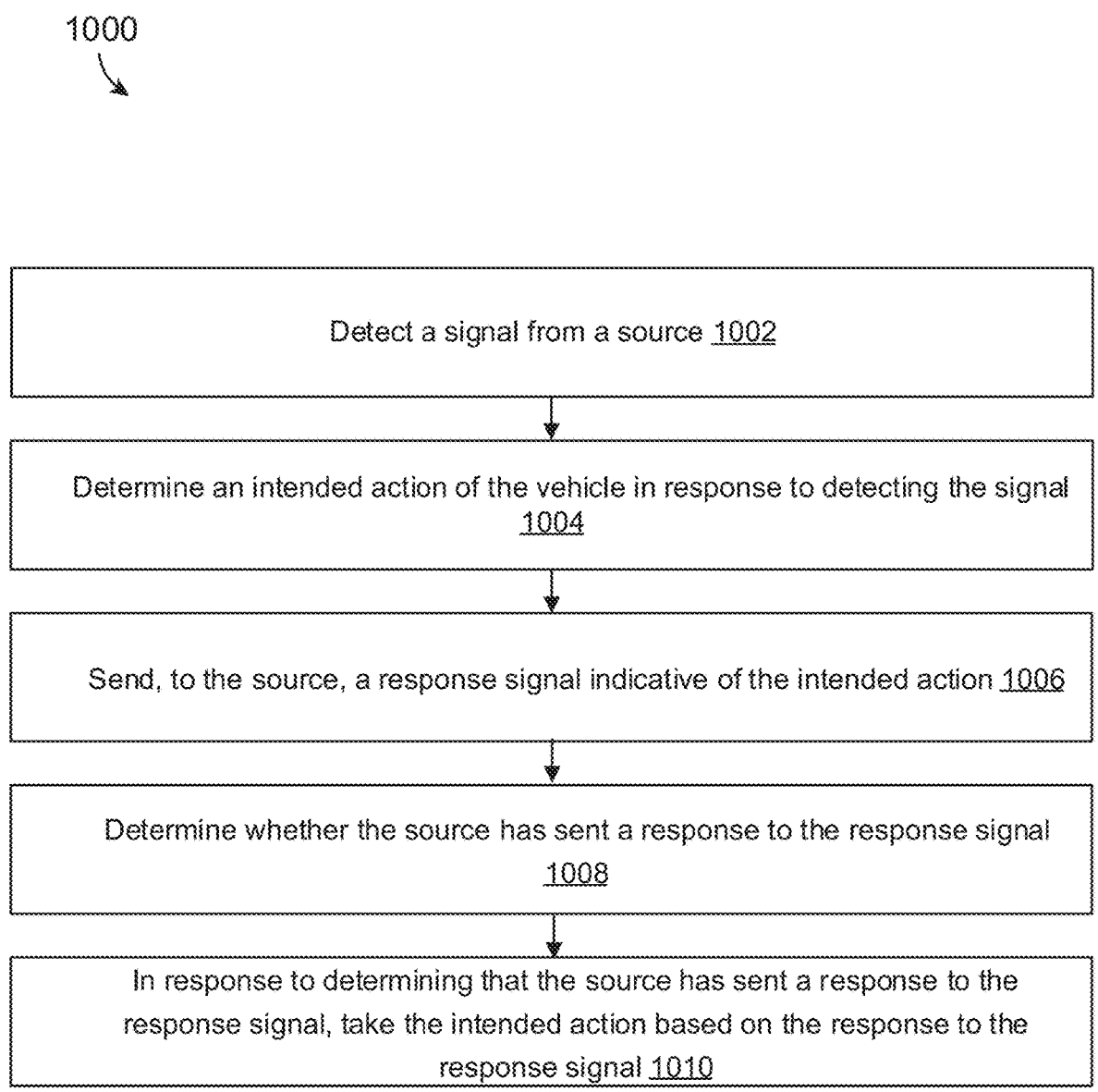
FIG. 10 illustrates a flowchart of an example of a method according to some embodiments of the present disclosure.

FIG. 10 illustrates a flowchart of a method according to some embodiments. In this and other flowcharts, the flowchart 1000 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 10.

In step 1002, one or more processors may detect a signal from a source. In step 1004, the one or more processors may determine an intended action of a vehicle in response to detecting the signal. In step 1006, the one or more processors may send, to the source, a response signal indicative of the intended action. In step 1008, the one or more processors may determine whether the source has sent a response to the response signal. In step 1010, the one or more processors may, in response to determining that the source has sent a response to the response signal, take the intended action based on the response to the response signal.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 11:
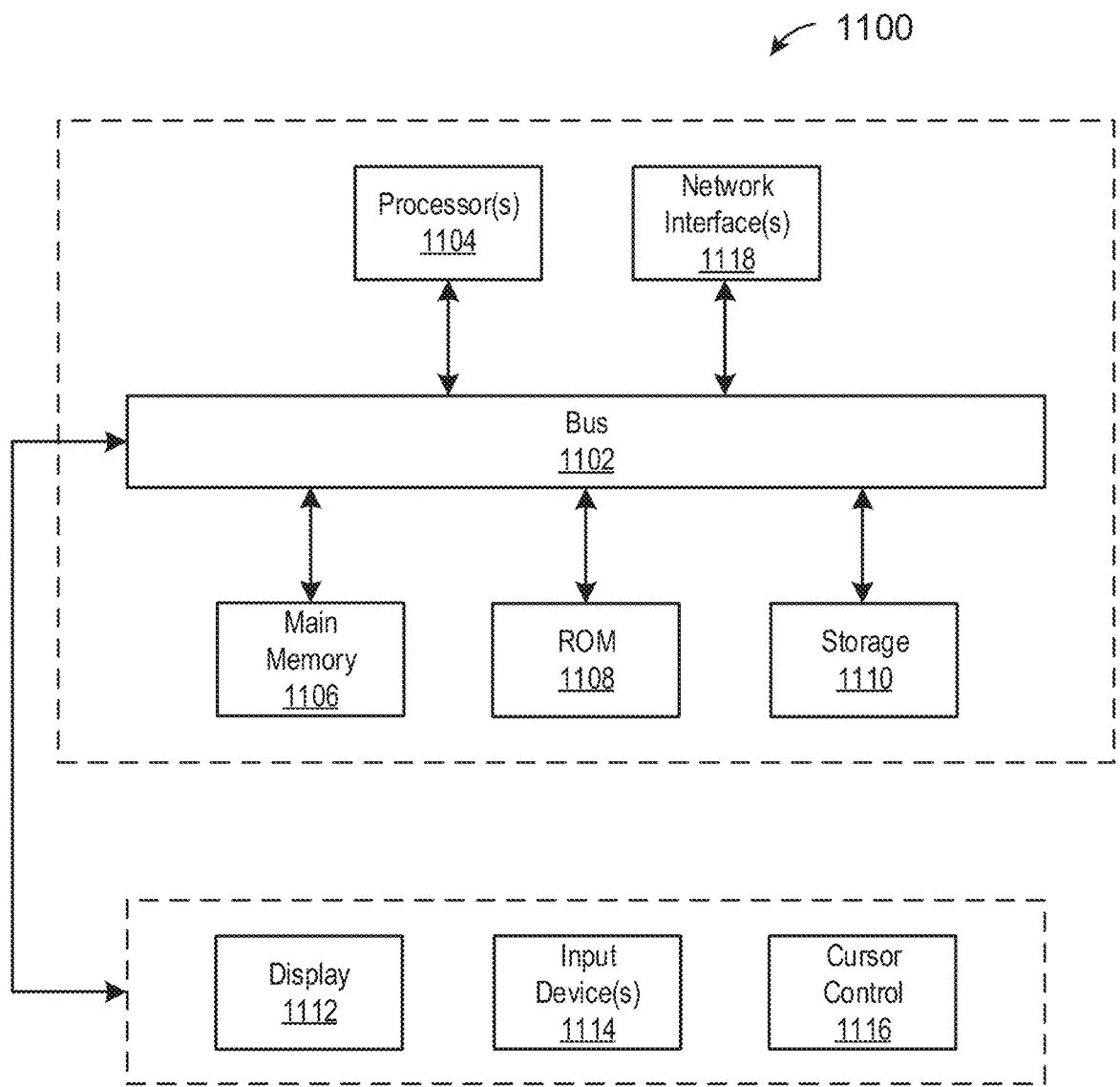
FIG. 11 is a diagram of an example computer system for implementing the features disclosed herein.

FIG. 11 is a block diagram that illustrates a computer system 1100 upon which any of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to output device(s) 1112, such as a cathode ray tube (CRT) or LCD display (or touch screen), for displaying information to a computer user. Input device(s) 1114, including alpha-numeric and other keys, are coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may retrieves and executes the instructions. The instructions received by main memory 1106 may optionally be stored on storage device 1110 either before or after execution by processor 1104.

The computer system 1100 also includes a communication interface 1118 coupled to bus 1102. Communication interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system of a vehicle comprising:
    one or more sensors comprising one or more LiDAR sensors and cameras, wherein the one or more sensors detect a second vehicle that is at least partially behind the vehicle and on a different lane;
    one or more processors; and
    a memory storing instructions that, when executed by the one or more processors, causes the system to perform:
        receiving, from the one or more sensors, sensor data comprising the second vehicle;
        determining, based on the sensor data, a location of the second vehicle relative to the vehicle;
        detecting a signal or a lateral movement from the second vehicle,
        based on the location, and the signal or the lateral movement of the second vehicle, determining whether the second vehicle is intending to merge into a lane occupied by the vehicle;
        in response to determining that the second vehicle is intending to merge into the lane occupied by the vehicle, determining whether to yield to permit the second vehicle to merge based on a predicted traffic imbalance across lanes or a predicted congestion in the lane occupied by the vehicle that would result from the second vehicle merging; and
    selectively yielding depending on the determination of whether to yield, wherein the selective yielding comprises:
        in response to determining to yield, shining a pulsed light corresponding to a side that the second vehicle is on;
        predicting that the second vehicle will speed up;
        determining whether the second vehicle has sped up;
        in response to determining that the second vehicle has sped up, slowing down the vehicle; and
        in response to determining that the second vehicle has not sped up, determining not to yield.

2. The system of claim 1, wherein, the instructions further cause the system to perform:
    in response to determining that the second vehicle has not sped up, continuing to shine the pulsed light;
    in response to continuing to shine the pulsed light, determining whether the second vehicle has sped up; and
    in response to determining that the second vehicle has sped up, determining to yield to the second vehicle.

3. The system of claim 1, wherein, the instructions further cause the system to perform:
    in response to determining that the second vehicle has not sped up, continuing to shine the pulsed light at an increased brightness;
    in response to continuing to shine the pulsed light, determining whether the second vehicle has sped up; and
    in response to determining that the second vehicle has sped up, determining to yield to the second vehicle.

4. The system of claim 1, wherein:
    the signal is a flashing light on a side of the second vehicle facing the vehicle, and indicates that the second vehicle intends to switch into a lane occupied by the vehicle.

5. The system of claim 1, wherein, the selective yielding comprises, in response to determining to yield, shining a pulsed light corresponding to a side that the second vehicle is on; and
    adjusting a brightness or a frequency of the pulsed light based on a weather or visibility condition.

6. The system of claim 1, wherein, the determination of whether the second vehicle is intending to merge comprises determining that the second vehicle is intending to merge in response to detecting that the second vehicle is moving in a lateral direction towards the vehicle.

7. The system of claim 1, wherein, the determination of whether to yield is based on an amount of interference with one or more other vehicles or pedestrians.

8. The system of claim 1, wherein, the instructions further cause the system to perform:

in response to detecting that the second vehicle and a third vehicle are both intending to merge into the lane, determining whether to yield to both the second vehicle and the third vehicle;

in response to determining not to yield to both the second vehicle and the third vehicle, determining whether the second vehicle or the third vehicle has a higher priority.

9. The system of claim 8, wherein, the determining of whether the second vehicle or the third vehicle has a higher priority is based on any of: whether a signal from the second vehicle or the third vehicle was detected first, a current location of the second vehicle and the third vehicle, and an intended destination of the second vehicle and the third vehicle.

10. A method implemented by a computing system including one or more processors and storage media storing machine-readable instructions, wherein the method is performed using the one or more processors, the method comprising:
   receiving, from one or more sensors comprising one or more LiDAR sensors and cameras, sensor data comprising a second vehicle that is at least partially behind the vehicle and on a different lane;
   determining, based on the sensor data, a location of the second vehicle relative to the vehicle;
   detecting a signal or a lateral movement from the second vehicle;
   based on the location, and the signal or the lateral movement of the second vehicle, determining whether the second vehicle is intending to merge into a lane occupied by the vehicle;
   in response to determining that the second vehicle is intending to merge into the lane occupied by the vehicle, determining whether to yield to permit the second vehicle to merge based on a predicted traffic imbalance across lanes or a predicted congestion in the lane occupied by the vehicle that would result from the second vehicle merging; and
   selectively yielding depending on the determination of whether to yield, wherein, the selective yielding comprises:
      in response to determining to yield, shining a pulsed light corresponding to a side that the second vehicle is on; and
      adjusting a brightness or a frequency of the pulsed light based on a weather or visibility condition.

11. The method of claim 10,
   wherein the selective yielding comprises:
      in response to determining to yield, shining a pulsed light corresponding to a side that the second vehicle is on;
      predicting that the second vehicle will speed up;
      determining whether the second vehicle has sped up;
      in response to determining that the second vehicle has sped up, slowing down the vehicle; and
      in response to determining that the second vehicle has not sped up, determining not to yield.

12. The method of claim 10, further comprising:
   in response to determining that the second vehicle has not sped up, continuing to shine the pulsed light;
   in response to continuing to shine the pulsed light, determining whether the second vehicle has sped up; and
   in response to determining that the second vehicle has sped up, determining to yield to the second vehicle.

13. The method of claim 10, further comprising:
   in response to determining that the second vehicle has not sped up, continuing to shine the pulsed light at an increased brightness;
   in response to continuing to shine the pulsed light, determining whether the second vehicle has sped up; and
   in response to determining that the second vehicle has sped up, determining to yield to the second vehicle.

14. The method of claim 10, wherein:
   the signal is a flashing light on a side of the second vehicle facing the vehicle, and indicates that the second vehicle intends to switch into a lane occupied by the vehicle.

15. The method of claim 10, wherein:
   the determination of whether the second vehicle is intending to merge comprises determining that the second vehicle is intending to merge in response to detecting that the second vehicle is moving in a lateral direction towards the vehicle.

16. The method of claim 10, wherein, the determination of whether to yield is based on an amount of interference with one or more other vehicles or pedestrians.

17. The system of claim 1, wherein the determination of whether to yield is based on a predicted delay to traffic behind the vehicle that would result from yielding.

18. The system of claim 1, wherein the determination of whether to yield is based on a predicted interference with one or more pedestrians.

19. A system of a vehicle comprising:
   one or more sensors comprising one or more LiDAR sensors and cameras, wherein the one or more sensors detect a second vehicle that is at least partially behind the vehicle and on a different lane;
   one or more processors; and
   a memory storing instructions that, when executed by the one or more processors, causes the system to perform:
      receiving, from the one or more sensors, sensor data comprising the second vehicle;
      determining, based on the sensor data, a location of the second vehicle relative to the vehicle;
      detecting a signal or a lateral movement from the second vehicle;
      based on the location, and the signal or the lateral movement of the second vehicle, determining whether the second vehicle is intending to merge into a lane occupied by the vehicle;
      in response to determining that the second vehicle is intending to merge into the lane occupied by the vehicle, determining whether to yield to permit the second vehicle to merge based on a predicted traffic imbalance across lanes or a predicted congestion in the lane occupied by the vehicle that would result from the second vehicle merging; and
      selectively yielding depending on the determination of whether to yield, wherein, the selective yielding comprises:
         in response to determining to yield, shining a pulsed light corresponding to a side that the second vehicle is on; and
         adjusting a brightness or a frequency of the pulsed light based on a weather or visibility condition.

* * * * *